(12) United States Patent
Zoss et al.

(10) Patent No.: US 12,223,577 B2
(45) Date of Patent: Feb. 11, 2025

(54) DATA-DRIVEN PHYSICS-BASED MODELS WITH IMPLICIT ACTUATIONS

(71) Applicants: DISNEY ENTERPRISES, INC., Burbank, CA (US); ETH Zürich (Eidgenössische Technische Hochschule Zürich), Zürich (CH)

(72) Inventors: Gaspard Zoss, La Tour-de-Peilz (CH); Baran Gözcü, Burbank, CA (US); Barbara Solenthaler, Burbank, CA (US); Lingchen Yang, Burbank, CA (US); Byungsoo Kim, Burbank, CA (US)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 198 days.

(21) Appl. No.: 18/159,651

(22) Filed: Jan. 25, 2023

(65) Prior Publication Data

US 2023/0237725 A1   Jul. 27, 2023

Related U.S. Application Data

(60) Provisional application No. 63/303,452, filed on Jan. 26, 2022.

(51) Int. Cl.
*G06T 13/00* (2011.01)
*G06T 13/40* (2011.01)
(Continued)

(52) U.S. Cl.
CPC .............. *G06T 13/40* (2013.01); *G06T 17/20* (2013.01); *G06T 19/20* (2013.01); *G06T 2210/36* (2013.01); *G06T 2219/2021* (2013.01)

(58) Field of Classification Search
None
See application file for complete search history.

(56) References Cited

U.S. PATENT DOCUMENTS 10,769,848 B1 * 9/2020 Wang ........................ G06T 7/50
10,937,237 B1 * 3/2021 Kim ........................ G06T 7/75
(Continued)

OTHER PUBLICATIONS

Bacher et al., "Design and Control of Soft Robots Using Differentiable Simulation", Current Robotics Reports, DOI: 10.1007/s43154-021-00052-7, vol. 2, 2021, pp. 211-221.
(Continued)

*Primary Examiner* — Martin Mushambo
(74) *Attorney, Agent, or Firm* — Squire Patton Boggs LLP; Sarah Mirza

(57) ABSTRACT

One embodiment of the present invention sets forth a technique for generating actuation values based on a target shape such that the actuation values cause a simulator to output a simulated soft body that matches the target shape. The technique includes inputting a latent code that represents a target shape and a point on a geometric mesh into a first machine learning model. The technique further includes generating, via execution of the first machine learning model, one or more simulator control values that specify a deformation of the geometric mesh, where each of the simulator control values is based on the latent code and corresponds to the input point, and generating, via execution of the simulator, a simulated soft body based on the one or more simulator control values and the geometric mesh. The technique further includes causing the simulated soft body to be outputted to a computing device.

20 Claims, 12 Drawing Sheets

(51) Int. Cl.
  *G06T 17/20* (2006.01)
  *G06T 19/20* (2011.01)

(56) References Cited

U.S. PATENT DOCUMENTS

| | | | | |
|---|---|---|---|---|
| 11,450,066 | B2* | 9/2022 | Kong | G06N 3/048 |
| 11,556,678 | B2* | 1/2023 | Mehr | G06T 19/20 |
| 11,995,854 | B2* | 5/2024 | Gallo | G06F 17/16 |
| 2019/0035150 | A1* | 1/2019 | Owechko | G06T 17/20 |
| 2020/0151952 | A1* | 5/2020 | Aksit | G06N 3/045 |
| 2022/0051485 | A1* | 2/2022 | Martin Brualla | G06T 15/506 |

OTHER PUBLICATIONS

Bao et al., "High-Quality Face Capture Using Anatomical Muscles", arXiv:1812.02836, Dec. 6, 2018, 16 pages.

Bouaziz et al., "Projective Dynamics: Fusing Constraint Projections for Fast Simulation", ACM Transactions on Graphics, vol. 33, No. 4, Article 154, DOI: 10.1145/2601097.2601116, Jul. 2014, pp. 154:1-154:11.

Casas et al., "Learning Nonlinear Soft-Tissue Dynamics for Interactive Avatars", In Proceedings of the ACM on Computer Graphics and Interactive Techniques, vol. 1, No. 1, Article 10, DOI: 10.1145/3203187, May 2018, pp. 10:1-10:15.

Chan et al., "pi-GAN: Periodic Implicit Generative Adversarial Networks for 3D-Aware Image Synthesis", In Proceedings of the 2021 IEEE/CVF Conference on Computer Vision and Pattern Recognition (CVPR), DOI: 10.1109/CVPR46437.2021.00574, 2021, pp. 5795-5805.

Chandran et al., "Semantic Deep Face Models", In 2020 International Conference on 3D Vision (3DV), DOI: 10.1109/3DV50981.2020.00044, 2020, pp. 345-354.

Degrave et al., "A Differentiable Physics Engine for Deep Learning in Robotics", Frontiers in Neurorobotics, vol. 13, Article 6, DOI: 10.3389/fnbot.2019.00006, Mar. 7, 2019, pp. 1-9.

Du et al., "DiffPD: Differentiable Projective Dynamics", ACM Transactions on Graphics, vol. 41, No. 2, Article 13, DOI: 10.1145/3490168, Nov. 2021, pp. 13:1-13:21.

Egger et al., "3D Morphable Face Models-Past, Present, and Future", ACM Transactions on Graphics, vol. 39, No. 5, Article 157, DOI: 10.1145/3395208, Jun. 2020, pp. 157:1-157:38.

Fulton et al., "Latent-space Dynamics for Reduced Deformable Simulation", Computer Graphics Forum, vol. 38, No. 2, DOI: 10.1111/cgf. 13645, 2019, pp. 379-391.

Geilinger et al., "ADD: Analytically Differentiable Dynamics for Multi-Body Systems with Frictional Contact", ACM Transactions on Graphics, vol. 39, No. 6, Article 190, DOI: 10.1145/3414685.3417766, Dec. 2020, pp. 190:1-190:15.

Hahn et al., "Real2Sim: Visco-elastic parameter estimation from dynamic motion", ACM Transactions on Graphics, vol. 38, No. 6, Article 236, DOI: 10.1145/3355089.3356548, Nov. 2019, pp. 236:1-236:13.

Holl et al., "Learning to Control PDEs with Differentiable Physics", In ICLR 2020, arXiv:2001.07457, Jan. 21, 2020, 28 pages.

Hu et al., "Difftaichi: Differentiable Programming For Physical Simulation", In ICLR 2019, arXiv:1910.00935, Oct. 1, 2019, 18 pages.

Hu et al., "ChainQueen: A Real-Time Differentiable Physical Simulator for Soft Robotics", In 2019 International Conference on Robotics and Automation (ICRA), DOI: 10.1109/ICRA.2019.8794333, May 20-24, 2019, pp. 6265-6271.

Huang et al., "Arbitrary Style Transfer in Real-time with Adaptive Instance Normalization", In 2017 IEEE International Conference on Computer Vision, DOI: 10.1109/ICCV.2017.167, 2017, pp. 1510-1519.

Ichim et al., "Phace: Physics-based Face Modeling and Animation", ACM Transactions on Graphics, vol. 36, No. 4, Article 153, DOI: 10.1145/3072959.3073664, Jul. 2017, pp. 153:1-153:14.

Kadleček et al., "Building Accurate Physics-based Face Models from Data", In Proceedings of the ACM on Computer Graphics and Interactive Techniques, vol. 2, No. 2, Article 15, DOI: 10.1145/3340256, Jul. 2019, pp. 15:1-15:16.

Kim et al., "Dynamic Deformables: Implementation and Production Practicalities", In ACM SIGGRAPH 2020, DOI: 10.1145/3388769.3407490, Aug. 2, 2020, 188 pages.

Kingma et al., "Adam: A Method For Stochastic Optimization", In ICLR 2015, arXiv:1412.6980, Jul. 23, 2015, 15 pages.

Klar et al., "Shape Targeting: A Versatile Active Elasticity Constitutive Model", In ACM SIGGRAPH 2020, DOI: 10.1145/3388767.3407379, Aug. 17, 2020, 2 pages.

Klehm et al., "Recent Advances in Facial Appearance Capture", Computer Graphics Forum, DOI: 10.1111/cgf. 12594, vol. 34, No. 2, 2015, pp. 709-733.

Lewis et al., "Practice and Theory of Blendshape Facial Models", Eurographics, STAR—State of the Art Report, 2014, pp. 199-218.

Li et al., "Learning Formation of Physically-Based Face Attributes", In 2020 IEEE/CVF Conference on Computer Vision and Pattern Recognition (CVPR), DOI: 10.1109/CVPR42600.2020.00347, 2020, pp. 3407-3416.

Liang et al., "Differentiable Cloth Simulation for Inverse Problems", In 33rd Conference on Neural Information Processing Systems (NeurIPS 2019), 2019, 10 pages.

Loper et al., "SMPL: A Skinned Multi-Person Linear Model", ACM Transactions on Graphics, vol. 34, No. 6, Article 248, DOI: 10.1145/2816795.2818013, Nov. 2015, pp. 248:1-248:16.

Macklin et al., "Primal/Dual Descent Methods for Dynamics", In ACM SIGGRAPH/Eurographics Symposium on Computer Animation, vol. 39, No. 8, DOI: 10.1111/cgf.14104, 2020, pp. 89-100.

Mahmood et al., "AMASS: Archive of Motion Capture as Surface Shapes", In 2019 IEEE/CVF International Conference on Computer Vision (ICCV), DOI: 10.1109/ICCV.2019.00554, 2019, pp. 5441-5450.

McAdams et al., "Computing the Singular Value Decomposition of 3×3 Matrices with Minimal Branching and Elementary Floating Point Operations", May 2011, 11 pages.

Mescheder et al., "Occupancy Networks: Learning 3D Reconstruction in Function Space", arXiv:1812.03828, Apr. 30, 2019, 11 pages.

Mildenhall et al., "NeRF: Representing Scenes as Neural Radiance Fields for View Synthesis", arXiv:2003.08934, Aug. 3, 2020, 25 pages.

Mitchell et al., "GRIDiron: An Interactive Authoring And Cognitive Training Foundation For Reconstructive Plastic Surgery Procedures", ACM Transactions on Graphics, vol. 34, No. 4, Article 43, DOI: 10.1145/2766918, Aug. 2015, pp. 43:1-43:12.

Or-El et al., "StyleSDF: High-Resolution 3D-Consistent Image and Geometry Generation", arXiv:2112.11427, Dec. 21, 2021, 17 pages.

Park et al., "DeepSDF: Learning Continuous Signed Distance Functions for Shape Representation", In Proceedings of the IEEE/CVF Conference on Computer Vision and Pattern Recognition (CVPR), DOI: 10.1109/CVPR.2019.00025, 2019, pp. 165-174.

Paszke et al., "PyTorch: An Imperative Style, High-Performance Deep Learning Library", In 33rd Conference on Neural Information Processing Systems (NeurIPS 2019), Dec. 3, 2019, 12 pages.

Pons-Moll et al., "Dyna: A Model of Dynamic Human Shape in Motion", ACM Transactions on Graphics, vol. 34, No. 4, Article 120, DOI: 10.1145/2766993, Aug. 2015, pp. 120:1-120:14.

Qiao et al., "Differentiable Simulation of Soft Multi-body Systems", In 35th Conference on Neural Information Processing Systems (NeurIPS 2021), 2021, 13 pages.

Qiao et al., "Scalable Differentiable Physics for Learning and Control", In Proceedings of the 37th International Conference on Machine Learning, arXiv:2007.02168, Jul. 4, 2020, 12 pages.

Sanchez-Gonzalez et al., "Learning to Simulate Complex Physics with Graph Networks", In Proceedings of the 37th International Conference on Machine Learning, arXiv:2002.09405, Sep. 14, 2020, 20 pages.

Santesteban et al., "SoftSMPL: Data-driven Modeling of Nonlinear Soft-tissue Dynamics for Parametric Humans", Computer Graphics Forum, DOI: 10.1111/cgf.13912, vol. 39, No. 2, 2020, pp. 65-75.

(56) References Cited

OTHER PUBLICATIONS

Sifakis et al., "Automatic Determination of Facial Muscle Activations from Sparse Motion Capture Marker Data", In ACM Transactions on Graphics, DOI: 10.1145/1073204.1073208, 2005, pp. 417-425.

Sitzmann et al., "Implicit Neural Representations with Periodic Activation Functions", In 34th Conference on Neural Information Processing Systems (NeurIPS 2020), 2020, 12 pages.

Srinivasan et al., "Learning Active Quasistatic Physics-based Models from Data", ACM Transactions on Graphics, vol. 40, No. 4, Article 129, DOI: 10.1145/3450626.3459883, Aug. 2021, pp. 129:1-129:14.

Tancik et al., "Fourier Features Let Networks Learn High Frequency Functions in Low Dimensional Domains", arXiv:2006.10739, Jun. 18, 2020, 24 pages.

Tang et al., "Honey, I Shrunk the Domain: Frequency-aware Force Field Reduction for Efficient Fluids Optimization", vol. 40, No. 2, DOI: 10.1111/cgf.142637, 2021, pp. 339-353.

Zhou et al., "CIPS-3D: A 3D-Aware Generator of GANs Based on Conditionally-Independent Pixel Synthesis", arXiv:2110.09788, Oct. 19, 2021, 10 pages.

Zoss et al., "Accurate Markerless Jaw Tracking for Facial Performance Capture", ACM Transactions on Graphics, vol. 38, No. 4, Article 50, DOI: 10.1145/3306346.3323044, Jul. 2019, pp. 50:1-50:8.

Zoss et al., "An Empirical Rig for Jaw Animation", ACM Transactions on Graphics, vol. 37, No. 4, Article 59, DOI: 10.1145/3197517.3201382, Aug. 2018, pp. 59:1-59:12.

Zoss et al., "Data-driven Extraction and Composition of Secondary Dynamics in Facial Performance Capture", ACM Transactions on Graphics, vol. 39, No. 4, Article 107, DOI: 10.1145/3386569.3392463, Jul. 2020, pp. 107:1-107:10.

* cited by examiner

DATA-DRIVEN PHYSICS-BASED MODELS WITH IMPLICIT ACTUATIONS

CROSS-REFERENCE TO RELATED APPLICATIONS

This application claims priority benefit of the United States Provisional Patent Application titled, "DATA-DRIVEN PHYSICS-BASED MODELS WITH IMPLICIT ACTUATIONS," filed on Jan. 26, 2022, and having Ser. No. 63/303,452. The subject matter of this related application is hereby incorporated herein by reference.

BACKGROUND

Field of the Various Embodiments

Embodiments of the present disclosure relate generally to machine learning and computer animation and, more specifically, to data-driven physics-based models with implicit actuations.

DESCRIPTION OF THE RELATED ART

In computer animation, a model of an object being animated is constructed in memory and used to generate a sequence of images that depict movement of the object over a period of time. Soft body animation refers to computer animation of objects that have deformable surfaces, such as human faces. An active soft body can deform in response to contact with other objects, or as a result of contraction of muscles under the surface of the active soft body.

A soft body model can be constructed to simplify the process of animating an active soft body. Once the model has been constructed, the active soft body's appearance can be controlled by specifying parameters for the model. For example, a soft body model can simulate the deformations of an active soft body caused by internal actuations, such as muscle contraction, or external stimuli such as contacts and external forces.

Manually creating such a soft body model is a very tedious and error prone process, since it typically requires an extensive knowledge of the underlying anatomy as well as expertise in translating anatomical features to a simulation model. Soft body models can also be created using automated processes. In some physics-based approaches, the process of creating a soft body model is simplified by abstracting away the internal anatomy and subdividing the simulated active soft body into a large number of tiny elements, each of those acting as an individual "muscle" that can stretch or contract. The amount by which each element is stretched or contracted can be specified by an actuation value. For a particular shape of the active soft body, the actuation value of each element can be inferred from data with the help of a differentiable Finite Element simulator that produces an output shape based on input actuation values. These optimization-based methods are often very slow at inference time, since optimization involves a large number of actuations for a given target shape.

One specific optimization-based approach involves training a large neural network to predict actuations of a voxelized volumetric mesh from a low dimensional latent vector. The large neural network is tied to a specific input representation and discretization. To reduce the computational complexity, the large neural network is manually customized to introduce some sparsity. This customization process is tedious and has to be repeated every time the shape or discretization changes. Further, the customization fixes the simulation discretization, as the network outputs directly the values for the actuations of all of the elements. Because of this design, the large neural network approach is limited in resolution and does not accurately reproduce high frequency details such as forehead wrinkles.

As the foregoing illustrates, what is needed in the art are more effective techniques for generating and controlling models of objects that have deformable surfaces.

SUMMARY OF THE INVENTION

One embodiment of the present invention sets forth a technique for generating actuation values based on a target shape such that the actuation values cause a simulator to output a simulated soft body that matches the target shape. The technique includes receiving a latent code that represents a target shape. The technique further includes inputting the latent code and a point on a geometric mesh into a first machine learning model. The technique further includes generating, via execution of the first machine learning model, one or more simulator control values that specify a deformation of the geometric mesh, where each of the simulator control values is based on the latent code and corresponds to the input point. The technique further includes generating, via execution of the simulator, a simulated soft body based on the one or more simulator control values and the geometric mesh. The technique further includes causing the simulated soft body to be outputted to a computing device, where the simulated soft body is used to perform one or more simulation operations.

One technical advantage of the disclosed techniques relative to the prior art is that the implicit function technique enables the neural network to be substantially smaller in size relative to neural networks used in existing techniques, while reliably reproducing fine details such as wrinkles. Another technical advantage of the disclosed techniques is that the shape generator machine learning model can be used for any input resolution, including resolutions that are higher or lower than the resolution for which the network was trained. Still another technical advantage of the disclosed techniques is that the gradient is computed using an efficient closed-form solution that does not involve the iterative approximation used by other gradient calculation techniques. Thus, the gradient can be computed more accurately and efficiently relative to other approaches to soft body modeling. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
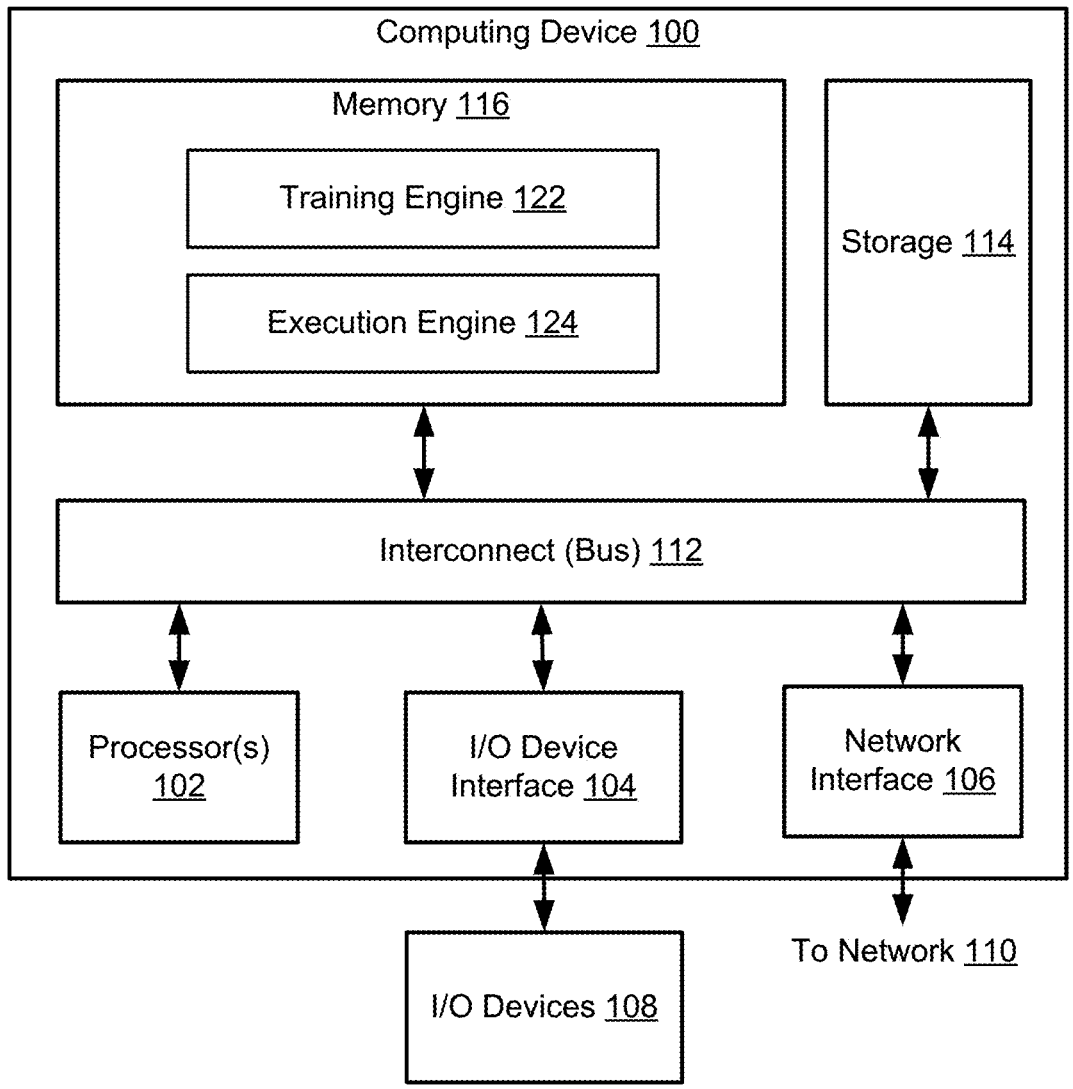
FIG. 1 illustrates a system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100. In another example, training engine 122 and/or execution engine 124 could execute on various sets of hardware, types of devices, or environments to adapt training engine 122 and/or execution engine 124 to different use cases or applications. In a third example, training engine 122 and execution engine could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and execution engine 124 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains one or more machine learning models to generate simulator actuations that cause a simulator to produce active soft body objects that resemble specified target shapes. Target shapes can be specified as input to a training process that trains a machine learning model to generate output resembling the target shapes. The active soft body can be animated by providing appropriate control input to the simulator, such as constraints or force vectors. The control input can cause the active soft body to deform consistent with deformations of the target shape seen in the training process.

For example, the training engine 122 could train an encoder neural network on a set of target poses to generate a latent code that represents the target poses in a latent space. The training engine 122 could further train an actuation-generating neural network to generate simulator actuations that cause a simulator to produce an active soft body based on the latent code, such that the active soft body resembles the target poses represented by the latent code. As another example, if the target poses depict a human face, the training engine 122 could train the actuation-generating neural network to generate simulator actuations that cause the simulator to produce an active soft body resembling the human face target poses. The training engine 122 could further train a jawbone-generating neural network to generate simulator control inputs that cause the simulator to move a jaw portion of an active soft body such movement of the jaw of the active soft body causes deformation of the active soft body resembling the jaw movement depicted in the human face target poses.

Training engine 122 could also, or instead, train the encoder neural network on new target poses that depict new facial expressions, while keeping the weights of the actuation-generating and jawbone-generating neural networks fixed. The encoder neural network then generates a latent code based on the new target poses, and the actuation-generating and jawbone-generating neural networks generate simulator actuations for the new target poses using their weights from previous training. The resulting active soft body produced by the simulator resembles the new target poses while also having characteristics of the previous target poses on which the actuation-generating and jawbone-generating neural networks were trained.

Execution engine 124 uses the trained machine learning model(s) to generate simulator actuations that cause the simulator to produce an active soft body resembling new target shapes not seen by the machine learning model(s) during the training process. For example, execution engine 124 could input a new set of target poses not seen during the training of the encoder, actuation-generating, and jawbone-generating neural networks. The encoder neural network generates a latent code that represents the new target poses while using weights trained on other target poses. The resulting latent code has characteristics of the new target poses and of the previous target poses on which the encoder neural network was trained. The actuation-generating and jawbone-generating neural networks can generate simulator actuations for the new target poses without being trained on the new target poses. The resulting active soft body produced by the simulator resembles the new target poses while also having characteristics of the previous target poses on which the actuation-generating and jawbone-generating neural networks were trained. Execution engine 124 could also, or instead, provide target poses to the encoder neural network at a different resolution than the resolution of the target poses on which the encoder neural network was trained. For example, execution engine 124 could specify a different resolution as an input to the encoder neural network. The encoder neural network, actuation-generating neural network, and/or jawbone-generating neural network can use any specified input and output resolutions without being retrained.

Neural Network Generation of Simulated Active Soft Bodies from Target Shapes

Figure 2A:
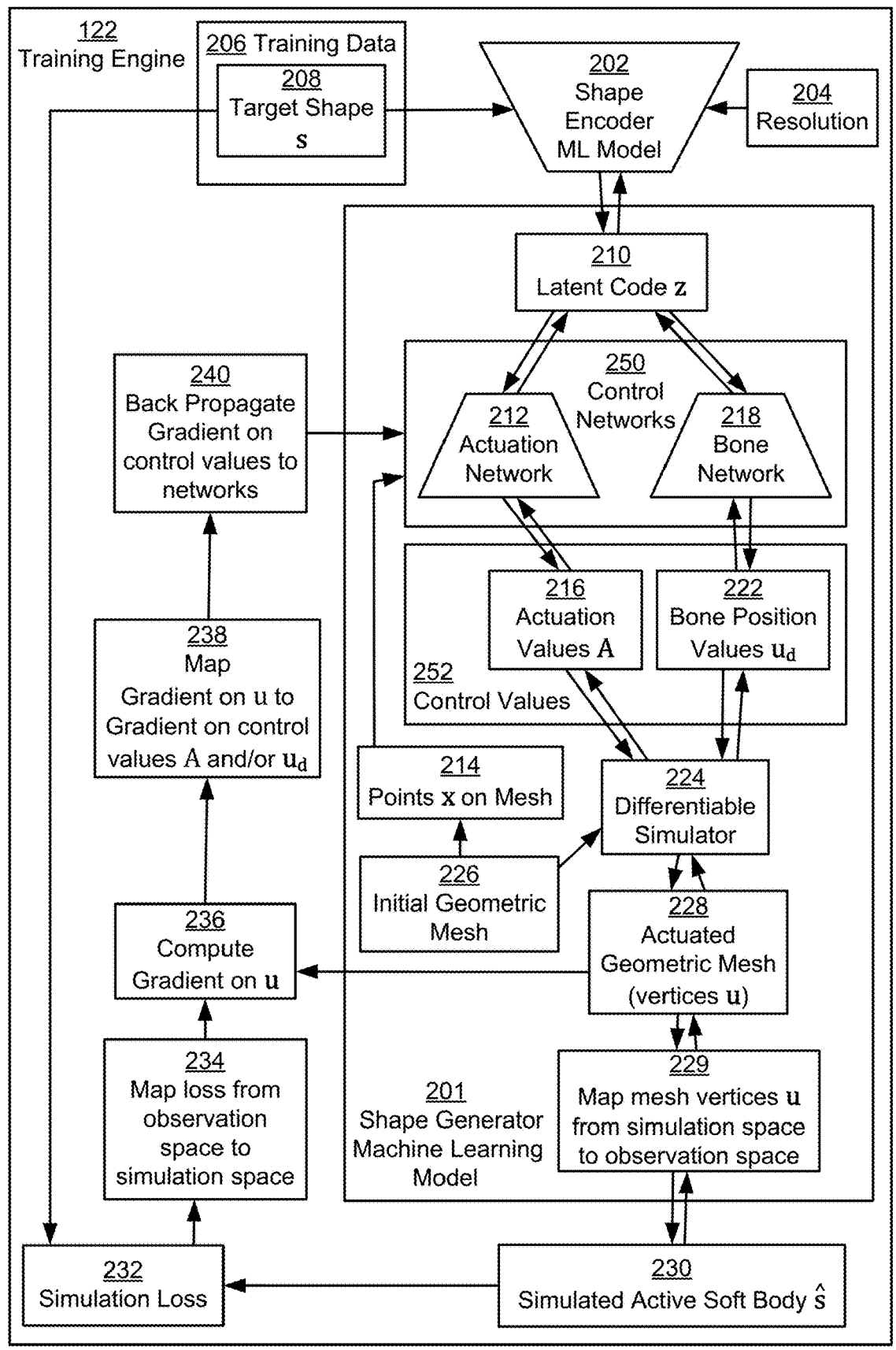
FIG. 2A is a more detailed illustration of the training engine of FIG. 1, according to various embodiments.

FIG. 2A is a more detailed illustration of training engine 122 of FIG. 1, according to various embodiments. More specifically, FIG. 2A illustrates the operation of training engine 122 in training one or more machine learning ("ML") models 201, 202 to generate simulator control values 252 that cause a differentiable simulator 224 to produce active soft body objects 230 that resemble specified target shapes 208. Differentiable simulators, also referred to as differentiable physics solvers, enable the use of gradient-based methods for solving complex control problems.

Differential simulator 224 generates the simulated active soft body 230. In various embodiments, differentiable simulator 224 deforms the shape of simulated active soft body 230 in accordance with an actuation mechanism. The internal actuation mechanism determines the shape of simulated active soft body 230 in accordance with laws of physics implemented by differentiable simulator 224. Simulated active soft body 230 is herein referred to as soft body 230 for brevity. In various embodiments, soft body 230 is represented as a geometric mesh that includes a set of mesh elements, which can be a hexahedra or tetrahedra. The geometric mesh can also include a set of mesh vertices that determine the shape of soft body 230. The actuation mechanism can induce a force that causes motion of the discrete mesh elements. The actuation mechanism can be controlled by artists to perform simulation operations such as shape targeting or other animation tasks.

Differentiable simulator 224 deforms the shape of soft body 230 by changing the spatial locations of the mesh vertices in accordance with the actuation mechanism. Soft body 230 can deform in response to contact with other objects, or as a result of stretching or contraction of hexahedral mesh elements, for example. The amount of stretching or contraction of each mesh element can be specified by an actuation value 216. Differentiable simulator 224 can also receive a bone position as input. The bone position can represent the position of a jaw bone, for example. A bone position input to differentiable simulator 224 that moves the jaw bone of a simulated face soft body downward can cause the mouth portion of the face and to open, for example. Constraints and external force vectors can be specified as input to differentiable simulator 224 to control the internal actuation mechanism and thereby deform the shape of soft body 230. Thus, a user such as an animator can use the simulated soft body to perform simulation operations. For example, a user can specify, via the differentiable simulator 224, an external force vector to cause the soft body 230 to deform accordingly. As another example, a user can specify constraints on the shape of the soft body 230, such as a constraint specifying that a mouth's lips are not to overlap when they collide.

Shape generator machine learning model 201 generates control values 252 for differentiable simulator 224 based on target shape 208. Control values 252 causes differentiable simulator 224 to generate actuated geometric mesh 228 that forms the shape of soft body 230 so that soft body 230 resembles target shape 208. Each target shape 208 can be a surface model generated from a sequence of poses depicted in a sequence of scanned images, for example. Differentiable simulator 224 produces deformations of soft body 230 in accordance with the actuation mechanism such that the deformations resemble the sequence of poses.

Control values 252 generated by differentiable simulator 224 includes actuation values 216 and bone position values 222. Actuation values 216 specify deformations of particular elements, e.g., as amounts by which particular elements are to stretch or contract. Bone position values 222 specify the position of points on a bone region of actuated geometric mesh 228, such as a jaw bone. Actuated geometric mesh 228 is generated by deforming initial geometric mesh 226. Initial geometric mesh 226 can be a template geometric mesh that is appropriate for target shape 208. For example, if target shape 208 depicts a human face, then initial geometric mesh 226 can be a template mesh of a human face that can be deformed by control values 252. Actuated geometric mesh 228 can be in a simulation space, e.g., a coordinate system of differentiable simulator 224. The simulation space can be different from a material observation space in which soft body 230 is represented and output for display to a computing device 100. Thus, actuated geometric mesh 228 can be mapped to soft body 230 by a mesh vertex mapping 229. Mesh vertex mapping 229 maps the vertices of actuated geometric mesh 228 from simulation space to observation space and generate soft body 230 from the observation space vertices. Initial geometric mesh 226 can be a voxelized mesh that includes a set of hexahedra, tetrahedra, or other suitable polygons, and a set of vertices, for example.

As described above, shape generator ML model 201 generates control values 252 for differentiable simulator 224 based on target shape 208. In various embodiments, shape generator ML model 201 receives a latent code 210 that represents target shape 208. The latent code 210 can be generated by a shape encoder machine learning model 202 based on target shape 208. The shape encoder 202 can be a neural network, for example. The shape encoder 202 can be trained to map target shape 208 to latent code 210. Latent code 210 encodes the target shape 208 as a low-dimensional set of latent variables, thereby learning a low-dimensional control space of the simulator instead of the shape space of the soft body. The control space of the simulator is low-dimensional compared to the shape space because the simulator provides physics-based modeling of the soft body's shape. The control values 252 for the simulator, such as the actuation values and bone position values, represent the deformation of the actuated geometric mesh 228 using substantially less information than would be used to directly represent the deformations of a three-dimensional shape. The shape encoder 202 learns the latent code 210 using a training process described below. A resolution 204 is specified as input to the shape encoder 202 to cause the shape encoder 202 to encode the target shape 208 to (and/or from) specified resolution(s). Example resolutions include 51K, 192K, 258K points, vertices, or hexahedra per shape pose or image, for example. Target shape 208 can be a surface mesh that contains vertices and faces, or other suitable representation.

Shape generator ML model 201 includes one or more simulator control networks 250 that generate simulator control values 252 based on latent code 210. Control networks 250 include actuation network 212 and/or bone position network 218. Control values 252 include actuation values 216 generated by actuation network 212 and/or bone position values 222 generated by bone position network 218. Control values 252 are provided as input to differentiable simulator 224 to cause differentiable simulator 224 to generate actuated geometric mesh 228, as described above. For example, shape generator ML model 201, as well as shape generator ML model 201 (including actuation network 212, and bone position network 218) could include, but are not limited to, one or more convolutional neural networks, fully connected neural networks, recurrent neural networks, residual neural networks, transformer neural networks, autoencoders, variational autoencoders, generative adversarial networks, autoregressive models, bidirectional attention models, mixture models, diffusion models, neural radiance field models, and/or other types of machine learning models that can process and/or generate content.

Each of the simulator control networks 250 can use an implicit representation in which a learned implicit function maps any coordinate position on initial geometric mesh 226 (or actuated geometric mesh 228) to corresponding control values 252 the coordinate position. The implicit function can be a continuous function that maps a spatial point on the mesh to a control value. Evaluating the implicit function at spatial points 214 distributed across the mesh produces control values 252 distributed across the mesh, thereby forming a mesh that resembles the target shape 208. Each evaluation of the implicit function can be performed by a respective execution of one or more of the control networks 250. Each evaluation of the implicit function can also, or instead, be performed by the same execution of one or more of the control networks 250. That is, one execution of control network 250 can generate control values 252 for one of the points 214. One execution of control network 250 can also or instead generate control values 252 for two or more of the points 214. Since particular points are provided to the control networks 250 as input, the control networks 250 is independent of a particular resolution. The implicit function earned by each control network 250 is defined on a continuous space, so that any point coordinates in the space can be specified. Each control network 250 then generates control values 252 that correspond to the specified point coordinates.

Because the control networks use the implicit representation, each control network is agnostic to the underlying shape representation. In other words, there is no need to manually re-define the network architecture or retrain the control network if the underlying representation or resolution changes. These properties render the method generally applicable to arbitrary soft body inputs and reduce the required expert knowledge, allowing artists to generate new poses and animations efficiently.

Training engine 122 trains shape generator ML model 201 and/or shape encoder 202 using training data 206 that includes a set of ground truth target shapes 208. Each target shape 208 can be a surface model generated from a sequence of poses depicted in a sequence of scanned images, for example.

As shown in FIG. 2A, training engine 122 performs a forward pass that inputs training data 206 into shape encoder 202 and obtains a latent code 210 as corresponding output of shape encoder 202. During the forward pass, training engine 122 also inputs latent code 210 into actuation network 212 and/or bone position network 218 and obtains actuation values 216 and/or bone position values 222, respectively. Thus, one or both of the control networks 250 can be trained in a forward pass. Training engine 122 also inputs one or more points 214 on initial geometric mesh 226 (or on actuated geometric mesh 228) into actuation network 212 and/or bone position network 218.

The forward pass performs a separate execution of actuation network 212 and/or bone position network 218 for each of the points 214 to be evaluated, as described above. The number of points 214 to be evaluated on the mesh are determined based on the resolution 204 and the size of the mesh, for example. The forward pass can also, or instead, provide more than one of the points 214 to each execution of actuation network 212 and/or bone position network 218. In one example, the forward pass perform one execution of actuation network 212 and/or one execution of bone position network 218 for all of the points 214 to be evaluated on the mesh.

Actuation values 216 include predictions of deformations of initial geometric mesh 226, and bone position values 222 include predictions of positions of a bone segment. Also during the forward pass, training engine 122 inputs actuation values 216 and/or bone position values 222 into differentiable simulator 224 and obtains actuated geometric mesh 228. Further, training engine 122 inputs actuated geometric mesh 228 into mesh vertex mapping 229 to map the actuated geometric mesh 228 from simulation space to observation space and obtain soft body 230 (according to the mesh vertex mapping 229, as described above).

After the forward pass is complete, training engine 122 performs a backward pass that updates parameters of the control network(s) 250. In the backward pass, training engine 122 computes one or more losses based on training data 206 and output generated by differentiable simulator 224. More specifically, training engine 122 computes one or more simulation losses 232 between soft body 230 and target shape 208. The simulation loss 232 can include (but is not limited to) one or more similarity losses. Each similarity loss can include a loss between the vertices of soft body 230 and the vertices of target shape 208 and/or a loss between normals of the vertices of soft body 230 and normals of the vertices of target shape 208. A vertex normal is, for example, a vector oriented perpendicular to a hexahedron that contains the vertex.

Since the simulation loss 232 is in the form of a loss on the vertices produced by the differentiable simulator 224, but the output of the control networks 250 to be optimized is in the form of control values 252 (e.g., actuation values 216 and/or bone position values 222), training engine 122 maps the simulation loss 232 to control values. More specifically, training engine 122 trains the shape encoder 202 and/or control networks 250 using gradient descent with back propagation of the gradient to the networks. Thus, training engine 122 computes the gradient of the shape encoder 202 and/or control networks 250 with respect to the vertices of the actuated geometric mesh 228. The gradient of the shape encoder 202 and/or control networks 250 the vertices can be computed based on the simulation loss 232 determined by the loss function. Since the simulation loss 232 is in the observation space, but the vertices of the actuated geometric mesh 228 are in the simulation space, the training engine 122 converts the simulation loss 232 to the simulation space by performing simulation loss mapping 234.

The result of simulation loss mapping 234 is the simulation loss on the vertices in simulation space. The training engine 122 computes the gradient accumulated on the vertices 228 (the partial derivative of the loss with respect to the vertices, at block 236) and maps the gradient accumulated on the vertices to the gradient accumulated on the control value(s) 252 (the partial derivative of the loss with respect to the control values). The mapping can be performed using the chain rule by multiplying the gradient accumulated on the vertices by the partial derivative of the vertices with respect to the control values (block 238) as described below.

The partial derivative of the vertices with respect to the control values is represented as a sensitivity matrix and is computed in a closed form as described below. The closed form of the sensitivity matrix is computed as a product of the inverse of a closed form of a Hessian matrix of the vertices and a closed form of a Hessian matrix of the control values, as described below. The closed form computations do not involve iterative approximation, so the sensitivity matrix can be calculated more accurately and efficiently than using iterative approximations of the Hessians (e.g., without the multiple iterations used in iterative approximations). Since the control parameters of the actuation network 212 are actuation values 216, whereas the control parameters of the bone position network 218 are bone position values 222, the mapping of the vertices to the control parameters of the actuation network 212 is different from the mapping of the vertices to the control parameters of the bone position values 222. Accordingly, an actuation network sensitivity matrix is calculated for training the actuation network 212, and a bone network sensitivity matrix is calculated for training the bone position network 218.

The gradient accumulated on the actuation values 216 can be determined by the chain rule as a product of the gradient accumulated on the vertices and the partial derivative of the vertices with respect to the actuation values. The latter partial derivative is the actuation network sensitivity matrix, which is calculated as a product of the gradient accumulated on the vertices, the inverse of the Hessian of the vertices, and the hessian of the actuation values. The actuation network sensitivity matrix provides mapping between the differentiable simulator 224 and the actuation network 212. The actuation network sensitivity matrix and its use, including the calculation of the Hessians on which the sensitivity matrix is based, is described in further detail below.

The gradient accumulated on the bone position values 222 is determined by deriving a sensitivity matrix that is used to map the gradient accumulated on the vertices to a gradient accumulated on the evaluated Dirichlet condition. The Dirichlet condition can represent a joint or pivot point link between the skull and the jaw bone, for example. The bone network sensitivity matrix provides a mapping between the differentiable simulator 224 and the bone position network 218. The bone network sensitivity matrix and its use, including the calculation of the Hessians on which the sensitivity matrix is based, is described in further detail below.

Training engine 122 back-propagates the gradient accumulated on the control values (including the gradient accumulated on the actuation values 216 and/or the gradient accumulated on the bone position values 222) to the respective control network(s) 250 (the actuation network 212 and/or the bone position network 218) in the backward pass (block 240). The back propagation updates parameters (e.g., weights) of the network(s) 250.

Training engine 122 also updates the shape encoder 202 in the backward pass based on the simulation loss 232 between the target shape 208 and the soft body 230, e.g., using gradient descent with back propagation. Training engine 122 calculates the gradient accumulated on the vertices of the soft body 230 and back propagate the gradient to the shape encoder 202. The back propagation to the shape encoder 202 updates parameters of the shape encoder 202.

Training engine 122 then determines whether a threshold condition is satisfied, e.g., whether simulation loss 232 falls below a threshold and/or until a threshold number of passes have been performed. If the threshold condition is not satisfied, training engine 122 continues by performing another forward pass followed by another backward pass until the threshold condition is satisfied.

While the operation of training engine 122 has been described above with respect to certain types of losses, it will be appreciated that shape encoder 202, actuation network 212, and/or bone position network 218 can be trained using other types of techniques, losses, and/or machine learning components. For example, training engine 122 could train shape encoder 202, actuation network 212, and/or bone position network 218 in an adversarial fashion with one or more discriminator neural networks (not shown) using one or more discriminator losses that are computed based on predictions generated by the discriminator neural network(s) from target shape 208 and soft body 230 and/or mesh vertex mapping 229.

After training of shape encoder 202 and one or more of actuation network 212 and bone position network 218 is complete, training engine 122 can freeze the parameters of actuation network 212 and/or bone position network 218 and train shape encoder 202 based on simulation loss 232. In this way, the actuation network 212 and/or bone position network 218 can be used to generate soft body 230 for target shapes 208 on which the actuation network 212 and/or bone position network 218 have not been trained. A target shape 208 on which a network has not been trained is referred to here as an "unseen" target shape 208. After training of shape encoder 202 and one or more of actuation network 212 and bone position network 218 is complete, execution engine 124 uses one or more components of the trained shape encoder 202 to generate soft body 230, as described below with respect to FIG. 2B.

Implicit Neural Representation and Training Using Closed-Form Hessians

Active objects can affect their shape through an internal actuation mechanism, as described above. Given an example pose of an object as input, a machine learning model is trained to determine, for each element of a soft body mesh, an actuation value that causes a differentiable simulator 224 to deform the rest pose of the soft body into the target shape. The machine learning model learns a low-dimensional control space, where a latent code 210 z is sampled to determine a fine-grained actuation mechanism corresponding to a shape. The model is trained via differentiable physics, which enables the differentiable simulator 224 to be integrated into the training of neural networks where gradient information can flow from the differentiable simulator 224 into the network in the backward pass of a training process. This technique can be extended to complex bodies as well, such as in facial soft tissues, where deformations can be substantially dominated by the underlying bone movement.

The machine learning model, e.g., a neural network, learns simulation control parameters $\Omega$ 252 from a set of target shapes s 208 such that after training, a simulator 224 using control parameters $\Omega$ can reconstruct target shapes s 208. The model is based on an energy function $E(u, \Omega)$, which describes the relation between the geometric mesh vertices u 228 and the control parameters $\Omega$ 252. The simulation is quasi-static and involves minimizing the energy E over the vertices u 228 given the control parameters $\Omega$ 252, thereby finding the optimal positions u* that make the net force become zero everywhere:

$$\nabla_u E(u^*, \Omega) = 0. \tag{1}$$

With this implicit constraint between u* and $\Omega$, the goal is to find the control parameters that minimize a loss function that measures the difference between the actuated geometric mesh vertices u 228 and the target shape s 208:

$$\Omega^* = \arg\min_{\Omega} \mathcal{L}(u^*(\Omega), s), \tag{2}$$

The sensitivity matrix $\partial u^*/\partial \Omega$, which is used in the training process, is derived by differentiating on both sides of Eqn. (1) with respect to $\Omega$:

$$\frac{\partial \nabla_u E}{\partial u}\bigg|_{(u^*,\Omega)} \frac{\partial u^*}{\partial \Omega} + \frac{\partial \nabla_u E}{\partial \Omega}\bigg|_{(u^*,\Omega)} = 0. \tag{3}$$

Omitting the explicit evaluation at (u*, $\Omega$) leads to a concise form:

$$\frac{\partial u^*}{\partial \Omega} = -\underbrace{\left(\frac{\partial \nabla_u E}{\partial u}\right)^{-1}}_{H_u} \underbrace{\frac{\partial \nabla_u E}{\partial \Omega}}_{H_\Omega}. \tag{4}$$

The factors on the right side of Eqn. (4) are the Hessians $H_u$ and $H_\Omega$.

This sensitivity matrix $\partial u^*/\partial \Omega$ is used to propagate the gradient accumulated on u* to $\Omega$ by the chain rule when optimizing the loss function $\mathcal{L}$:

$$\frac{\partial \mathcal{L}}{\partial \Omega} = \frac{\partial \mathcal{L}}{\partial u} \frac{\partial u^*}{\partial \Omega} = -\frac{\partial \mathcal{L}}{\partial u} H_u^{-1} H_\Omega. \tag{5}$$

Implicit Formulation

Generally, any continuous mechanical property can be represented using a neural network N that takes as input a spatial point x in the material space (undeformed space) and outputs the corresponding property value, e.g., $\Omega_x = N(x)$. An implicit formulation of an internal actuation mechanism is derived as follows. To animate an active object, the actuation mechanism is controlled via an actuation network $N_A$ 212, trained on target poses represented by target shapes s 208. A shape-targeting energy density function $\Psi$ for the internal actuation model is given as $$\Psi(F, A) = \min_{R \in SO(3)} \|F - RA\|_F^2, \tag{6}$$

where F is the local deformation gradient and A is a symmetric 3×3 actuation matrix, whose eigenvectors indicate the muscle contraction directions and eigenvalues the magnitudes of the local deformation. The rotation matrix R factors away the rotational difference between F and A and makes $\Psi$ rotationally-invariant. An actuation matrix is assigned to each spatial point x in the object's material space, i.e., $A(x) = NA(x)$. For the following equations, vec($\cdot$) denotes row-wise flattening of a matrix into a vector, and the expanded matrix $\hat{A}$ as:

$$\hat{A} = \begin{bmatrix} A & 0 & 0 \\ 0 & A & 0 \\ 0 & 0 & A \end{bmatrix}. \tag{7}$$

Using $\tilde{f}$=vec(F), $\tilde{r}$=vec(R), and $\hat{A}\tilde{r}$=vec(RA), the continuous energy function $\tilde{E}$ in the simulation is defined as $$\tilde{E} = \int_{\mathcal{D}^0} \frac{1}{2} \|\tilde{f}(x) - \hat{A}(x)\tilde{r}^*(x)\|_2^2 dV, \tag{8}$$

where $D_0$ denotes the material space of the object, and $\tilde{r}$* is the vectorized rotation matrix for point x, precomputed from the polar decomposition of FA. Using the Finite Element method, $D_0$ is discretized using tiny elements connected by nodal vertices u:

$$\tilde{E} = \sum_e \int_{\mathcal{D}_e^B} \frac{1}{2} \|\tilde{f}(x) - \hat{A}(x)\tilde{r}^*(x)\|_2^2 dV \qquad (9)$$

$$\approx \sum_e \frac{V_e}{N} \sum_i^N \frac{1}{2} \|\tilde{f}(x_{e,i}) - \hat{A}(x_{e,i})\hat{r}^*(x_{e,i})\|_2^2 \qquad (10)$$

$$E(u, \mathcal{A}) = \sum_e \frac{V_e}{N} \sum_i^N \underbrace{\frac{1}{2} \|G(x_{e,i})u_e - \hat{A}(x_{e,i})\tilde{r}^*(x_{e,i})\|_2^2}_{\Psi_{e,i}}, \qquad (11)$$

where $\mathcal{A}$ denotes all the sampled actuation matrices A from the actuation network $N_A$, 212 i.e., A(x)=NA(x), e denotes an element, and $\mathcal{D}_e^0$ indicates the continuous region inside e while $V^e$ is its volume. N points are sampled inside each $D_e^0$ to approximate the integral (Eqn. (10)). The deformation gradient f at each point can be approximated by the concatenated nodal vertices $u_e$, associated with the element e where $x_{e,i}$ resides, via the corresponding mapping matrix G (Eqn. (11)). Hexahedral elements are adopted and projective dynamics are used for minimizing e. $\Psi_{e,i}$ in Eqn. (11) is used for deriving the Hessian $H_u$ in Eqn. (4) of the energy density function $\Psi$, since $H_u$ is the accumulation of all Hessians $\nabla^2 \Psi_{e,i}$. As a result of projective dynamics, and omitting (x, e, i,*) except $u_e$ for simplicity, $\nabla\Psi = G^T(Gu_e - \hat{A}\check{r})$. Taking the derivative of $\nabla\Psi$, $$\frac{\partial \nabla \Psi}{\partial u_e} = G^\top G - G^\top \hat{A} \frac{\partial \check{r}}{\partial \hat{A}\check{f}} \frac{\partial \hat{A}\check{f}}{\partial u_e} \qquad (12)$$

$$G^\top G - G^\top \hat{A} \frac{\partial \check{r}}{\partial \hat{A}\check{f}} \hat{A} G \qquad (13)$$

$$G^\top G - G^\top \hat{A} H_R \hat{A} G. \qquad (14)$$

Note that $\check{r}$ comes from the polar decomposition of $\hat{A}\check{f}$ $H_R$ is the rotation gradient, namely the derivative with respect to $\hat{A}\check{f}$. The closed form for $H_R$ is constructed from its three eigenvectors q and eigenvalues $\lambda$, i.e., $$H_R = \sum_i \lambda_i q_i q_i^\top$$

Similarly, the partial derivative $\partial \nabla \Psi / \partial \check{a}$ is $$\frac{\partial \nabla \Psi}{\partial \check{a}} = -G^\top \hat{A} H_R \hat{F} - G^\top \hat{R}, \qquad (15)$$

which is used for constructing the Hessian $H_\Omega$ in Eqn. (4) of the energy density function $\Psi$ ($\Omega$ denotes actuation values A 216). The sensitivity matrix is used to calculate the gradient accumulated on the sampled actuation matrices, building the connection between the actuation network $N_A$ 212 and the simulator 224. Compared to other approaches, in which the Hessians are approximated by performing several iterations of sensitivity analysis, the closed form for the Hessians described above can be used to compute the Hessians in a single iteration.

Network Architecture

The sinusoidal representation network SIREN can be used for the actuation network $N_A$ 212 because of its effective sine activation function h→sin(Wh+b), where h is the output hidden vector from a previous layer, and W and b are trainable parameters in the current layer. Since SIREN does not handle high-dimensional inputs well, i.e., directly concatenating the latent code z and spatial point x as input, W is instead conditioned on z as $$W_{i,j} = \alpha_i \hat{W}_{i,j}, \qquad (16)$$

Where $a_i$ is the modulating coefficient decoded from z with a tiny MLP, $\hat{W}$ is the shared weight matrix in this layer, and i and j enumerate the dimensions of input and output feature vectors, respectively. The motivation for this conditioning mechanism is that a signal (actuation) can be approximated as the linear combination (W) of a set of basis functions (the output h of the previous SIREN layer). One advantage of modulating the weight matrix W instead of h is to save memory. Since a large number of points are sampled (e.g., ~268k in one example) for the simulation, modulating h causes a hidden vector to be cached for each sampled point used in backpropagation; modulating W on the other hand entails only one such operation, which can be shared for each sampled point.

Training Strategy

A two-stage training strategy is used. In the first stage, a plausible approximation of the actuation is calculated from the target shape 208 s, which can be used to pretrain the actuation network 212 $N_A$ without the differentiable simulator 224. More specifically, the actuation is approximated by dragging a volumetric simulation mesh into the given target shape with virtual zero-rest-length springs. The resulting local deformations are used to initialize the actuation values $\mathcal{A}$ (which can be matrices). This pretraining serves as a warm-up and can be used to identify the appropriate dimension of the latent code z. In the second stage, the parameters of the actuation network $N_A$ 212 can be fine-tuned using end-to-end training in the simulator-integrated pipeline. The loss function for $\mathcal{L}$ problem is defined as $$\mathcal{L} = \sum_i |\hat{s}_i - s_i| + \alpha|1 - \hat{n}_i^\top n_i|, \qquad (17)$$

where i refers to the vertices in the observation space, s and n indicate the ground truth vertex positions and normals, $\hat{s}$ and $\hat{n}$ are the vertex positions u 228 and normals mapped from the simulation space, and $\alpha \in R$ is a control weight.

The machine learning model is generalized across shapes and resolutions. Resolution invariance is a prerequisite for practical use, as it enables a decision on the resolution at test time depending on the given requirements on speed or geometric fidelity. The network captures the dominant frequencies of the signal, and thus transfer learning on a different resolution (1 epoch) is sufficient to make the network consistent with the new discretization. Alternatively, the actuation-generative network $N_A$ can be conditioned on a continuous resolution input, so that one forward pass can be performed to obtain the optimal actuation. To do so, another small MLP is added on top of $N_A$, that takes as input the resolution value, and adds up the output to the shape latent code z.

Facial Animation

For soft bodies that represent faces, the underlying geometry can be extended with bone structures. Diverse expressions can be articulated by considering the relative motion between the skull and the mandible. Thus, the skull position is fixed, and mandible kinematics are included in the optimization.

Different from the actuation mechanism acting on the inside of the soft tissue, the bone structure is located at the boundary and defines the Dirichlet condition in the simulation. The position of the bone is determined by a bone position network $N_B$ 218, which takes a spatial point on the bone region of the object as input and outputs the transformed position. For learning the parameters of NB, we divide the simulation vertices u into two parts $u=[u_c, u_d]$, where $u_c$ denotes the nodal vertices located inside the soft tissue, and $u_d$ those on the bone region which defines a Dirichlet condition that constrains the motion of the bone relative to the skull. Given that $u_d$ is calculated with the bone position network $N_B$ 218, a quasi-static solution for $u_c^*$ satisfies $$\nabla_{u_c} E([u^*_c, u_d], \mathcal{A}) = 0, \quad (18)$$

With such an implicit constraint between $u_c^*$ and $u_d$, the bone network sensitivity matrix $\partial u_c^*/\partial u_d$ can be derived by taking the derivative of Eqn. (18) on both sides with respect to $u_d$:

$$\frac{\partial u_c^*}{\partial u_d} = -\underbrace{\left(\frac{\partial \nabla_{u_c} E}{\partial u_c}\right)^{-1}}_{H_{cc}} \underbrace{\frac{\partial \nabla_{u_c} E}{\partial u_d}}_{H_{cd}}, \quad (19)$$

where $H_{cc}$ and $H_{cd}$ are the submatrices of the Hessian $H_u$ (which is derived above). They are constructed by selecting the relevant rows and columns of $H_u$. The bone network sensitivity matrix is used to calculate the gradient accumulated on the evaluated Dirichlet condition, thereby establishing a mapping between the bone position network NB 218 and the differentiable simulator 224.

As described above, the architecture for facial animation includes the shape encoder 202, an actuation-generative network $N_A$ 212 and a bone (e.g., jaw) position network NB 218. The shape encoder 202 outputs a latent code z 210 representing an input target face shape s 208. Actuation network $N_A$ 212 is conditioned on z to generate the actuation values A 216 (e.g., a matrix) for each input point in the soft tissue domain. The bone position network $N_B$ 218 is also conditioned on z to produce the transformed bone position for each input point in the mandible domain. For the bone position network NB 218, rigid motion is assumed, and an MLP is used to regress the transformation matrix T from z such that $N_B(x,y)=T(z)x$. Note that T is shared for each input point but differs from expression to expression (e.g., can be different for different target shapes 208). During the first training stage, the mandible position can be approximated using a facial feature tracking method. The second stage can then include the bone position network NB 218 in the optimization.

Figure 2B:
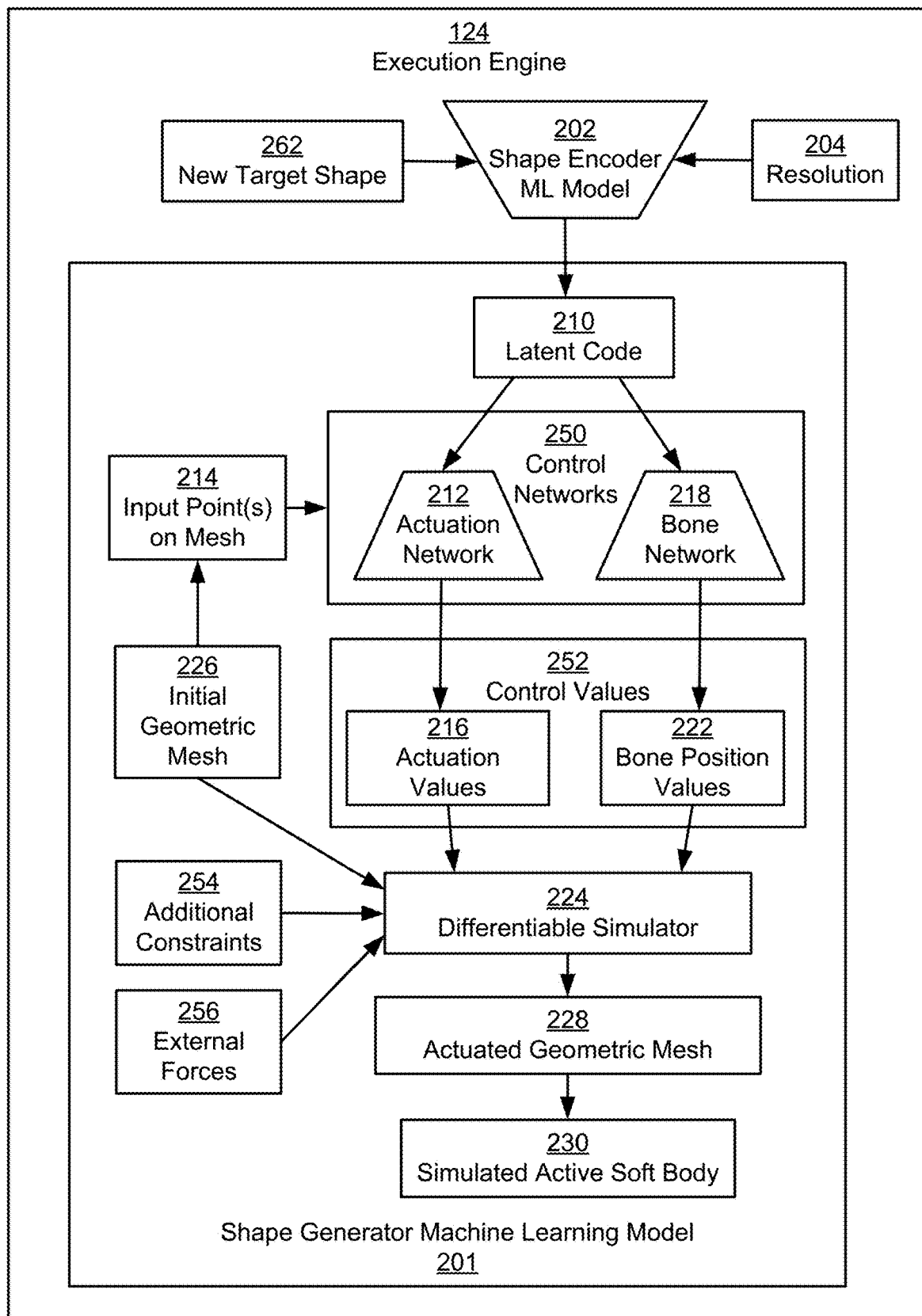
FIG. 2B is a more detailed illustration of the execution engine of FIG. 1, according to various embodiments.

FIG. 2B is a more detailed illustration of the execution engine 124 of FIG. 1, according to various embodiments. More specifically, FIG. 2B illustrates the operation of execution engine 124 in using one or more machine learning models 201, 202 to generate simulator control values 252 that cause a differentiable simulator 224 to produce active soft body objects 230 that resemble specified target shapes 208.

After training of shape generator ML model 201 is complete, execution engine 124 uses one or more components of the trained ML model 201 to generate soft body 230. In particular, execution engine 124 uses shape encoder 202 to convert new target shape 262 to latent code 210. New target shape 262 can be different from target shape 208. Execution engine 124 can also use one or both of control networks 250 to generate control values 252 based on latent code 210, and use differentiable simulator 224 to convert control values 252 to actuated geometric mesh 228. Actuated geometric mesh 228 is converted to soft body 230, and execution engine 124 outputs soft body 230. For example, soft body 230 can be outputted on a display of computer system 100 and subsequently distorted in response to further control input provided to differentiable simulator 224, e.g., by an artist or animator. The further control input can include additional constraints 254 and external forces 256. For example, an additional constraint 254 for soft body that represents a human face can specify that the mouth's lips are not to overlap when they collide. As another example, an external force vector can cause the soft body 230 to deform in accordance with the direction and magnitude of the force vector.

Figure 3:
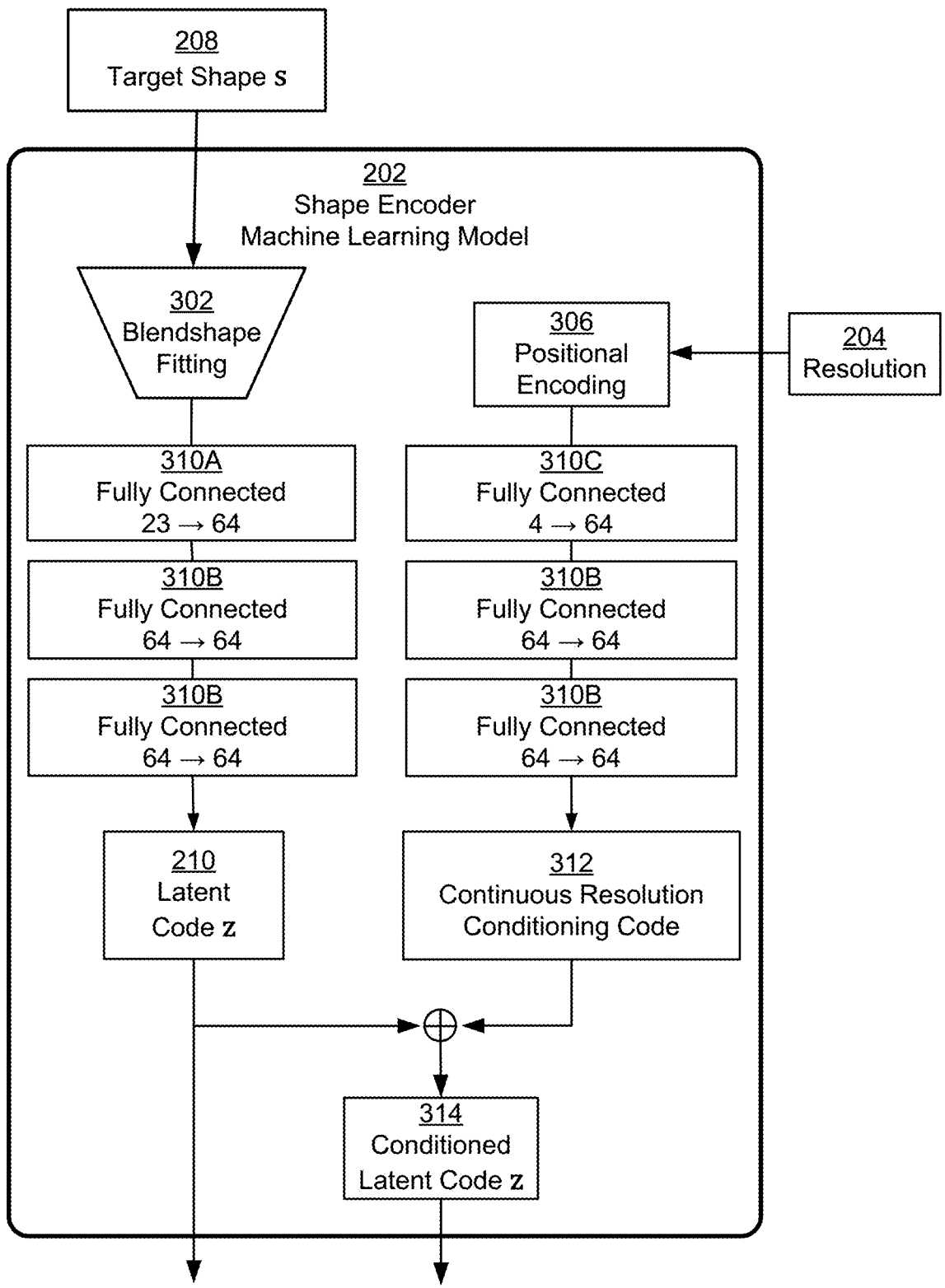
FIG. 3 illustrates a shape encoder ML model, according to various embodiments.

FIG. 3 illustrates a shape encoder 202, according to various embodiments. The shape encoder 202 is trained to convert a target shape 208 to a latent code 210 or a conditioned latent code 210. The conditioned latent code 210 is conditioned on one or more particular resolutions 204, and is provided to an actuation network 212 to condition the actuation network 212 for use on continuous-resolution input.

The shape encoder 202 includes a "blendshape" fitting component 302 followed by three fully connected layers 310. The blendshape fitting component 302 can be a global shape descriptor having weights fitted from a set of blendshapes. Blendshapes approximate a space of valid poses, and new poses can be computed as a linear, weighted combination of the basis shapes. The blendshape fitting component 302 receives the target shape 208 as input, and produces an output that is provided to a first fully connected layer 310A (e.g., mapping an input vector size of 23 to an output vector size of 64). The first fully connected layer 310A is followed by a second fully connected layer 310B (e.g., 64 to 64) and a third fully connected layer 310B (e.g., 64 to 64). The third fully connected layer 310B outputs a latent code 210.

For continuous resolution conditioning, the shape encoder 202 includes another branch that produces a continuous resolution conditioning code 312 based on a resolution 204. The shape encoder 202 includes a conditioning branch that combines the continuous resolution conditioning code 312 with the latent code 210, e.g., by addition, and provide the resulting conditioned latent code 314 to the actuation network 212. The conditioning branch starts with a positional encoding layer 306 to convert the 1-dimensional scalar resolution 204 input into a 4 dimensional feature vector, followed by 3 fully connected layers, which produce a 64-dimensional output vector. The shape encoder network 201 and shape generator network 202 are used (e.g., in combination, as shown in FIG. 2A) pretrained without this branch on one resolution (e.g., 268K sampled points) to execute transfer learning for continuous resolution conditioning.

For continuous resolution training, a number of different resolutions (e.g., 20) can be uniformly sampled, with the number of sampled points ranging from, e.g., 42K to 268K, and use the networks 201, 202 (e.g., in combination). A number of training epochs are used (e.g., 30 epochs) with a batch size of 1 and a learning rate of 0.0001 (decayed to 0 gradually) to train the networks 201, 202. For execution of the networks 201, 202, a number of resolutions (e.g., 25) different from the training resolutions are uniformly sampled. Although a particular number of layers and particular sizes of the layers are shown in the example of FIG.

3, a different number of layers and/or different size(s) of layers can be used in other examples.

Figure 4:
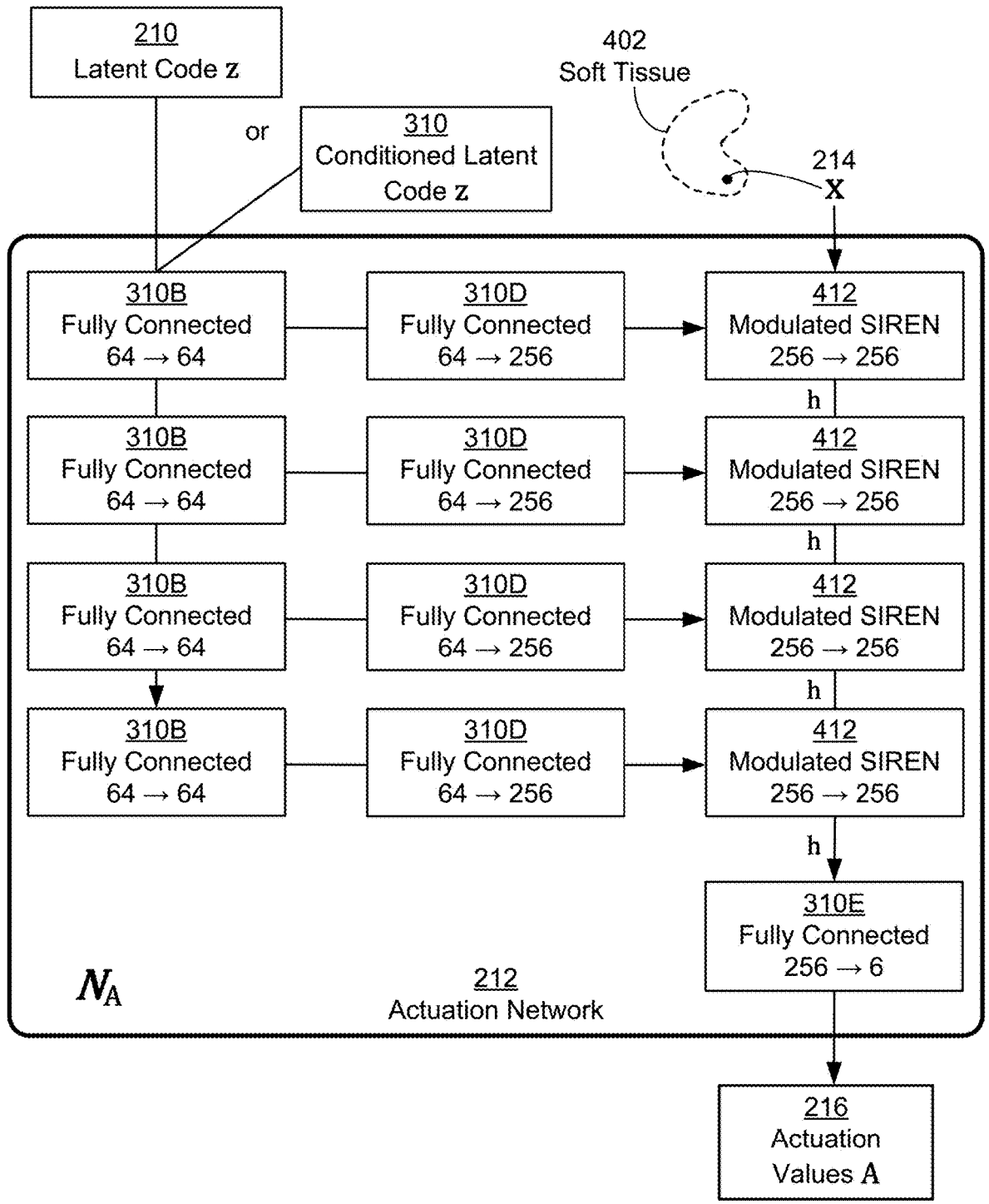
FIG. 4 illustrates an actuation network that generates actuation values based on a latent code representation of a target shape, according to various embodiments.

FIG. 4 illustrates an actuation network 212 that generates actuation values 216 based on a latent code 210 or a conditioned latent code 314 that represents a target shape 208, according to various embodiments. The actuation network 212 is trained to convert a latent code 210 or conditioned latent code 314 to actuation values 216. The conditioned latent code 314, which can be generated by the shape encoder 202 as shown in FIG. 3, is conditioned to provide continuous resolution input. If the actuation network 212 uses the conditioned latent code 314, then the actuation network 212 can process continuous-resolution input. The actuation values 216 can be provided to an actuation network 212, which generates an actuated geometric mesh 228 based on the actuation values 216.

The actuation network 212 uses four modulated SIREN (sinusoidal representation network) layers as a backbone layer. Modulating coefficients are mapped from the latent code 210 with a small multi-layer perceptron (MLP). The actuation network 212 includes four layers, each of which includes two fully-connected layers 310 that map the latent code 210 from 64 dimensions to a 256-dimensional modulating coefficient for a respective SIREN layer. The hyperparameter ω0 for SIREN can be set to 30, for example. The output of the final SIREN layer 412 is passed to a fully connected layer 310F that maps the 256-dimensional SIREN output to a 6-element actuation value 216. The actuation network 212 can generate actuation values 216 for each spatial input point 214. The spatial input points can be located on a soft tissue region 402 (e.g., of an initial geometric mesh 226).

Figure 5:
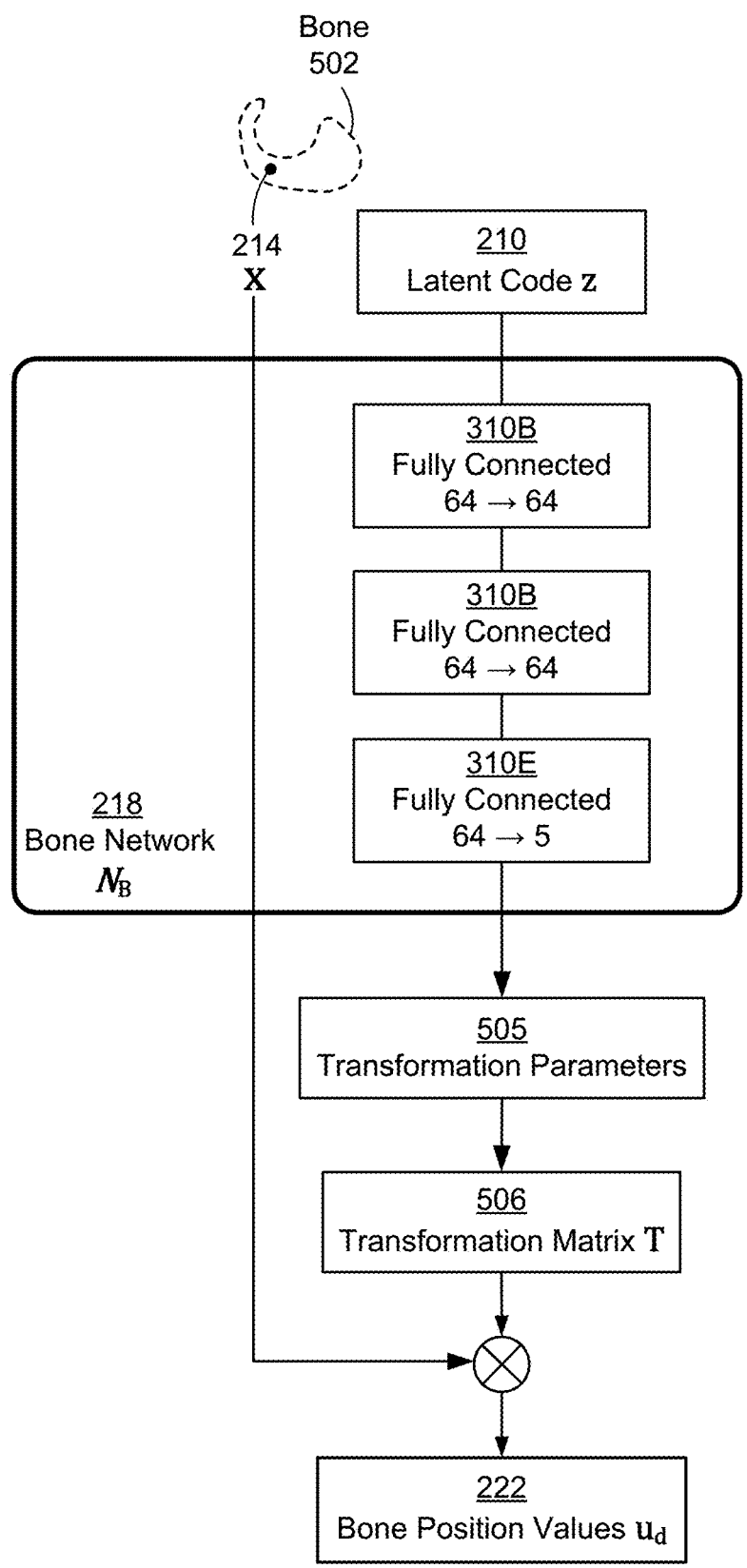
FIG. 5 illustrates a bone network that generates bone position values based on a latent code representation of a target shape, according to various embodiments.

FIG. 5 illustrates a bone position network 218 that generates bone position values 222 based on a latent code 210 that represents a target shape 208, according to various embodiments. Jaw bone motion is linked to the skull via a pivot point, represented as a joint with two degrees of freedom for rotation and three for translation, specified by transformation parameters 505. The transformation parameters 505 include θx, θy and a three-dimensional translation tx, ty, tz. The transformation parameters 505, specified as a 5-dimensional vector, $\{θx, θy, tx, ty, tz\} \in R^5$, are the direct output of the bone position network 218. The transformation parameters 505 are subsequently converted into a transformation matrix 506. The bone position network 218 includes three fully connected layers 310 that map a 64-dimensional latent code 210 to the 5-dimensional vector of parameters 505 used to construct the transformation matrix 506. The transformation matrix 506 is combined with each point x 214 on bone 502 using matrix-vector multiplication of the transformation matrix 506 by each point x 214 The results of the multiplication, which specify the transformed jaw bone position, are output by the bone position network 218 as a bone position value $u_d$ 222.

Figure 6A:
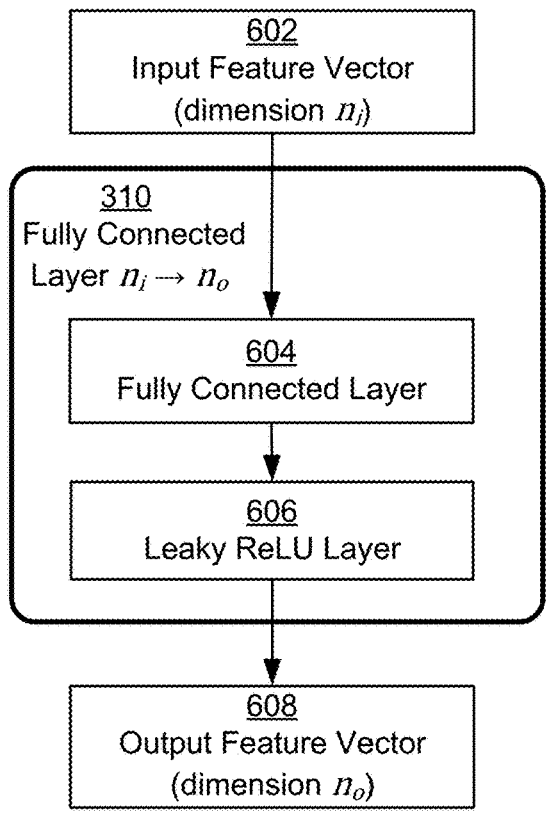
FIG. 6A illustrates a fully-connected block used by the actuation network of FIG. 4 and the bone network of FIG. 5, according to various embodiments.

FIG. 6A illustrates a fully-connected layer 310 used by the actuation network 212 of FIG. 4 and the bone position network 218 of FIG. 5, according to various embodiments. The fully connected layer 310 receives an input feature vector 602 of dimension $n_i$ and generates an output feature vector 608 of dimension $n_O$. The fully connected layer 310 includes a fully connected layer 604 to which the input feature vector 602 is provided, and a Leaky ReLU (Leaky Rectified Linear Unit) layer 606 to which the output of the fully connected layer 604 is provided. The Leaky ReLU nonlinearity layer 606 can have, for example, a 0.01 negative slope, and generates the output feature vector 608. Although the Leaky ReLU activation layer is described in this example, any suitable activation function, such as ReLU, GeLU (Gaussian Error Linear Unit), or other suitable activation function, can be used in other examples.

Figure 6B:
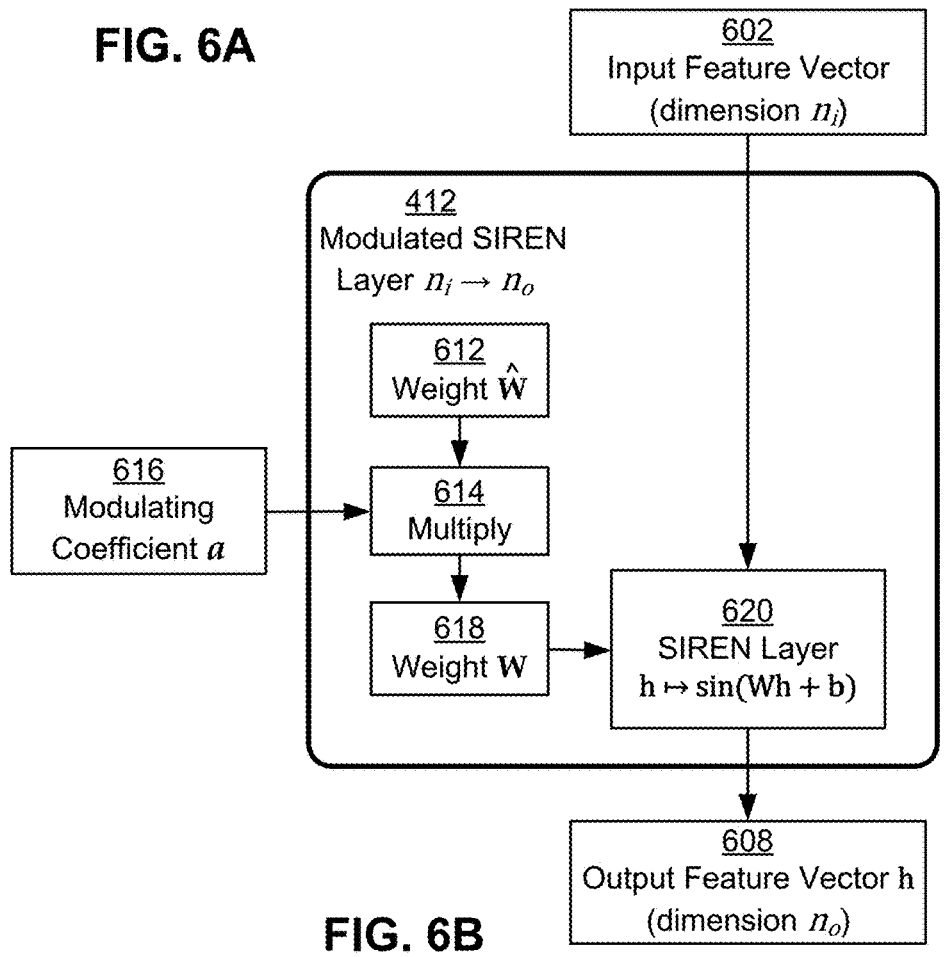
FIG. 6B illustrates a modulated SIREN (sinusoidal representation network) block used by the actuation network of FIG. 4, according to various embodiments.

FIG. 6B illustrates a modulated SIREN (sinusoidal representation network) layer 412 used by the actuation network 212 of FIG. 4, according to various embodiments. The modulated SIREN layer 412 receives an input feature vector 602 of dimension $n_i$ and generates an output feature vector 608 of dimension $n_o$. The modulated SIREN layer 412 includes a fully connected layer 620 that receives the input feature vector 602. The fully-connected layer 620 is followed by a sine activation function having weights 618 that are conditional on a modulating coefficient 616. For example, initial weight 612 can be multiplied at block 614 by modulating coefficient 616 to produce modulated weight 618. The output of the sine activation function is used as the output of the modulated SIREN layer 412. The weight modulated weight 618 is computed by multiplying an initial weight 612 by the modulating coefficient 616.

Figure 7A:
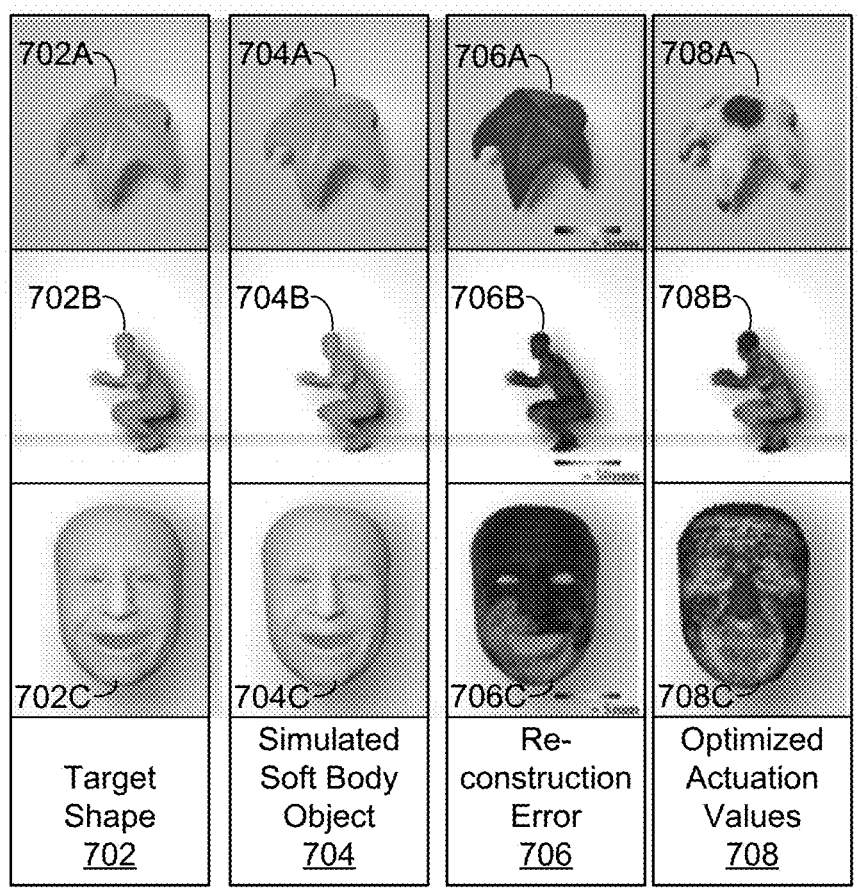
FIG. 7A illustrates target shapes, simulated soft body objects, reconstruction error, and optimized actuation values for starfish, human body, and face datasets, according to various embodiments.

FIG. 7A illustrates target shapes 702, simulated soft body objects 704, reconstruction error 706, and optimized actuation values 708 for starfish, human body, and face datasets, according to various embodiments. FIG. 7A shows the training results for the three datasets. In each of the three examples, the shape generator ML model 201 and shape encoder 202 reliably reproduce the target shapes 702 with the optimized actuation values 708, as indicated by the low reconstruction error 706. The actuation values 708 are color-coded on the hexahedral mesh on the right, where blue and red indicate a low and high value, respectively. Note that the implicit representation network contains only 0.3 million parameters but has the representational power to reliably reproduce fine details such as wrinkles. In contrast, the number of parameters of explicit models depends on the geometric mesh (discretization) and is typically two orders of magnitude larger.

The top row of FIG. 7A shows a target shape 702A for a starfish, the simulated starfish soft body object 704B generated from the starfish target shape 702A, a representation of the reconstruction error 706A between the starfish target shape 702A and the starfish soft body object 704B, and a representation of the optimized actuation values 708A that cause the simulator 224 to generate the starfish soft body object 704B.

The second row shows a target shape 702A for a human body, the simulated human body object 704B generated from the human body target shape 702A, a representation of the reconstruction error 706A between the human body target shape 702A and the human body object 704B, and a representation of the optimized actuation values 708A that cause the simulator 224 to generate the human body object 704B.

The third row shows a target shape 702A for a face, the simulated face soft body object 704B generated from the face target shape 702A, a representation of the reconstruction error 706A between the face target shape 702A and the face soft body object 704B, and a representation of the optimized actuation values 708A that cause the simulator 224 to generate the face soft body object 704B. For the face example shown in the third row, both actuation values 216 and bone position values 222 of jawbone kinematics are optimized. The bone position network 218 enables direct computation of a jaw position that is compatible with the actuation, as shown further in FIG. 8.

Figure 7B:
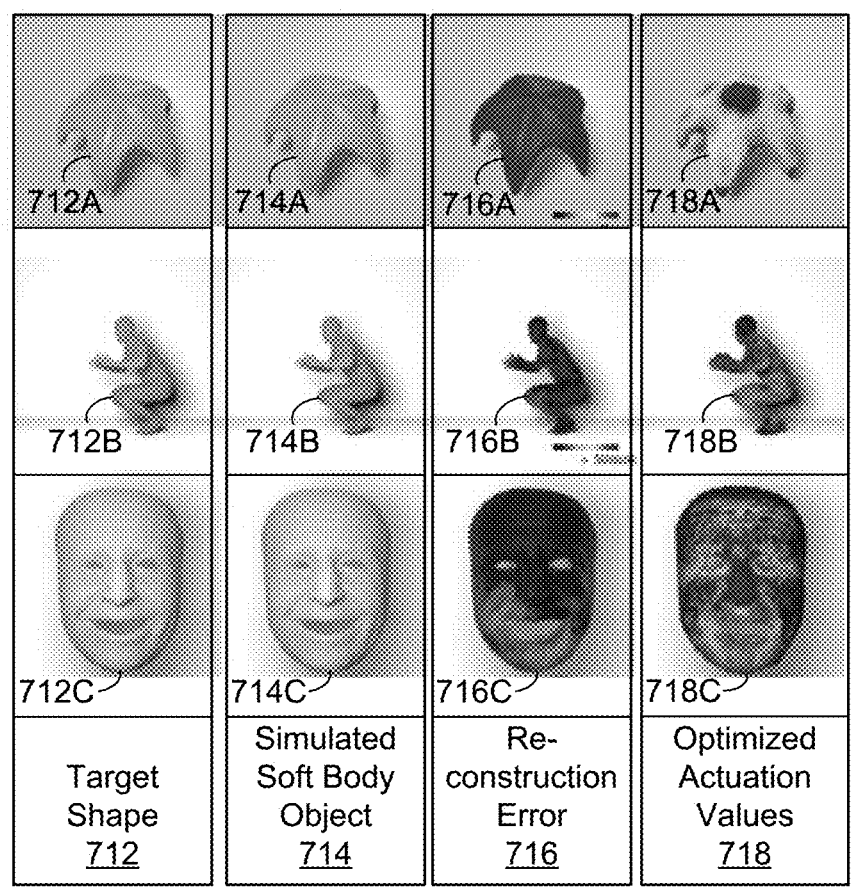
FIG. 7B illustrates simulated soft body objects generated by an execution engine for unseen target shapes on which an execution engine was not trained, according to various embodiments.

FIG. 7B illustrates simulated soft body objects generated by an execution engine for unseen target shapes on which an execution engine 124 was not trained, according to various embodiments. Using the trained model, new target shapes 208 can be fit by keeping the weights of the actuation network 212 and bone position network 218 fixed and optimizing the shape encoder 202 for the latent code 210 that yields the best fit. To do so, the shape encoder 202 is first used to generate an initialized latent code 210, then the training engine 122 trains the shape encoder 202 for 10 iterations (e.g., 10 repetitions of the forward and backward training passes). FIG. 7B illustrates the result for unseen target poses and the associated low errors.

The top row of FIG. 7B shows an unseen target shape 712A (on which an execution engine was not trained) for a starfish, the simulated starfish soft body object 714B generated from the starfish target shape 712A, a representation of the reconstruction error 716A between the starfish target shape 712A and the starfish soft body object 714B, and a representation of the optimized actuation values 718A that cause the simulator 224 to generate the starfish soft body object 714B.

The second row shows an unseen target shape 712A for a human body, the simulated human body object 714B generated from the human body target shape 712A, a representation of the reconstruction error 716B between the human body target shape 712A and the human body object 714B, and a representation of the optimized actuation values 718A that cause the simulator 224 to generate the human body object 714B.

The third row shows an unseen target shape 712A for a face, the simulated face soft body object 714B generated from the face target shape 712A, a representation of the reconstruction error 716C between the face target shape 712A and the face soft body object 714B, and a representation of the optimized actuation values 718A that cause the simulator 224 to generate the face soft body object 714B.

Figure 8:
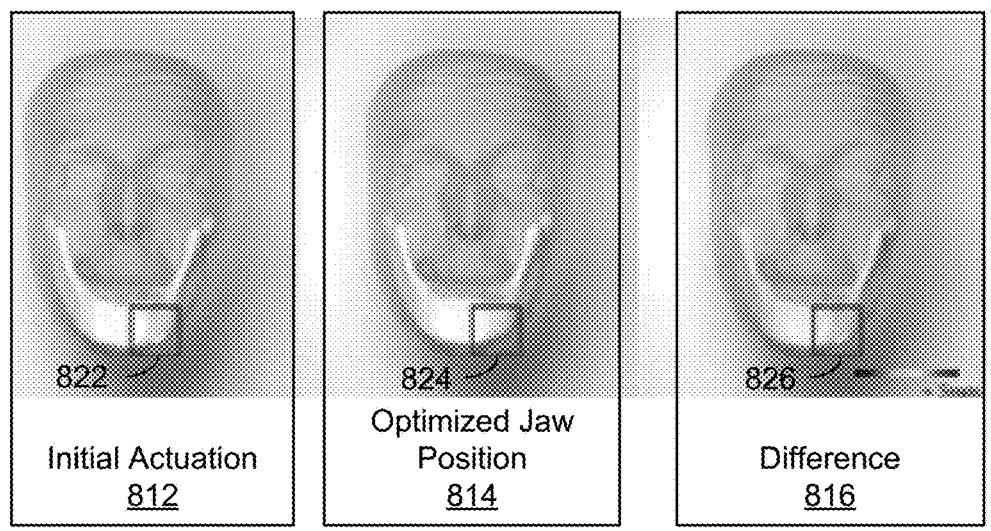
FIG. 8 illustrates an optimized jaw position produced by a bone network in comparison to an initial actuation provided as input to the bone network, according to various embodiments.

FIG. 8 illustrates an optimized jaw position 814 produced by a bone position network 218 in comparison to an initial actuation 812 provided as input to the bone network, according to various embodiments. The bone position network 218 enables computation of a jaw position 814 that is compatible with the actuation generated by the actuation network 212. This direct computation of the jaw position compatible with the actuation was not possible in previous approaches, in which the boundary conditions associated with skeletal attachments are presumed known at all time instances. The differentiable connection between the jaw and simulator reduces the error and resolves collision artifacts (highlighted in box 822) of the initial actuation 812, shown in the first column. The absence of collision artifacts in the optimized jaw position 814 can be seen in box 824 in the second column. Box 826 in the third column shows the difference 816 between the collision artifacts in box 822 of the initial actuation and the absence of collision artifacts in box 824 of the optimized jaw position 814.

Figure 9:
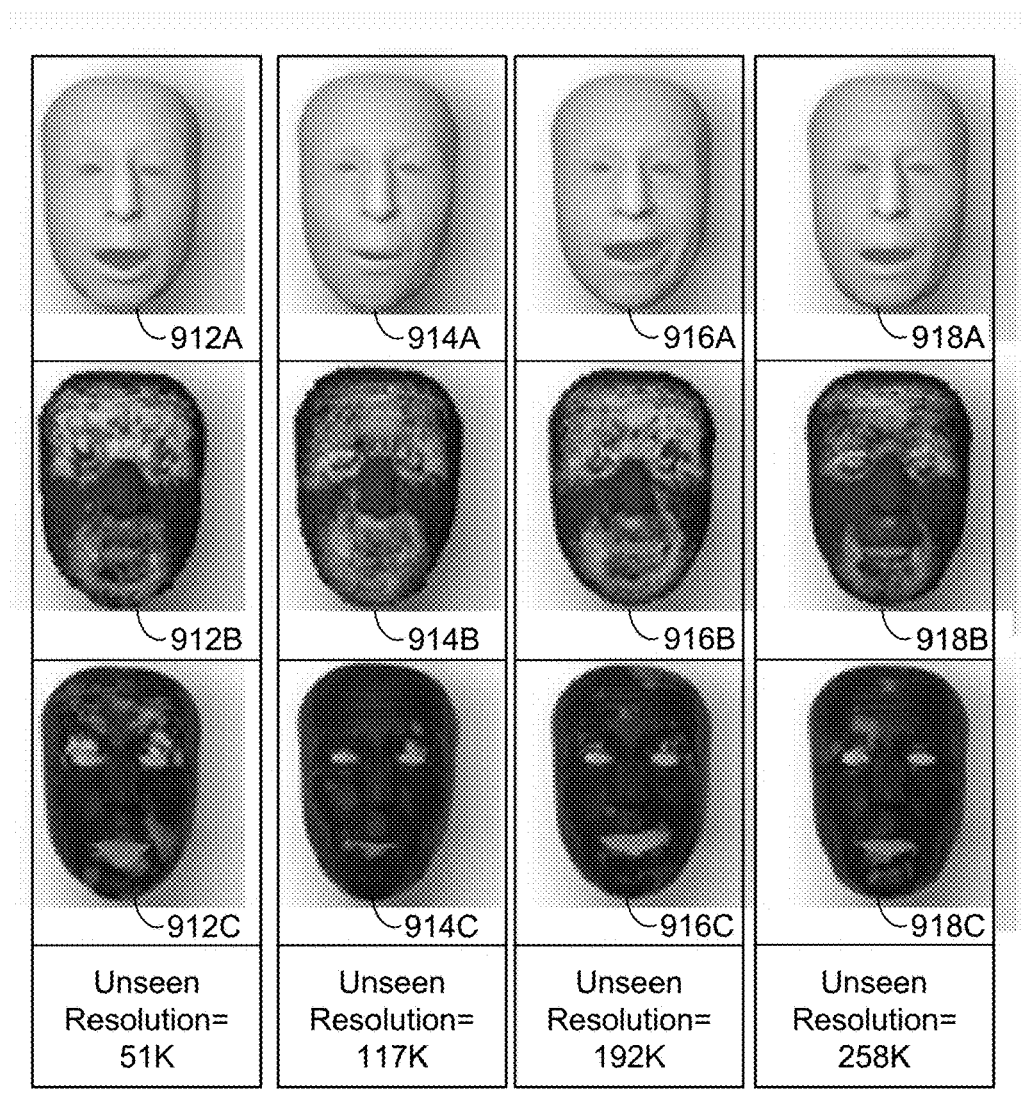
FIG. 9 illustrates simulated soft body objects generated by an execution engine for four different input resolutions on which an execution engine was not trained, according to various embodiments.

FIG. 9 illustrates simulated soft body objects generated by an execution engine 124 for four different unseen input resolutions on which an execution engine 124 was not trained, according to various embodiments. The input resolutions of the four columns are 51K, 117K, 192K, and 258K points, respectively. The first column of FIG. 9 shows a simulated face soft body object 912A generated by the execution engine 124 at a resolution of 51K, a representation of the optimized actuation values 912B that cause the simulator 224 to generate the face soft body object 912A, and a representation of the reconstruction error 912C between a target shape (not shown) and the face soft body object 912A. As can be seen by the low error 912C, 914C, 916C, 918C in FIG. 9, the execution engine 124 successfully generalizes to continuous resolution input.

The second column of FIG. 9 shows a simulated face soft body object 914A generated by the execution engine 124 at a resolution of 117K points, a representation of the optimized actuation values 914B that cause the simulator 224 to generate the face soft body object 914B, and a representation of the reconstruction error 914C between a target shape (not shown) and the face soft body object 914A.

The third column of FIG. 9 shows a simulated face soft body object 916A generated by the execution engine 124 at a resolution of 192K points, a representation of the optimized actuation values 916C that cause the simulator 224 to generate the face soft body object 916A, and a representation of the reconstruction error 916C between a target shape (not shown) and the face soft body object 916A.

The fourth column of FIG. 9 shows a simulated face soft body object 918A generated by the execution engine 124 at a resolution of 258K points, a representation of the optimized actuation values 918C that cause the simulator 224 to generate the face soft body object 918A, and a representation of the reconstruction error 918C between a target shape (not shown) and the face soft body object 918A.

Figure 10:
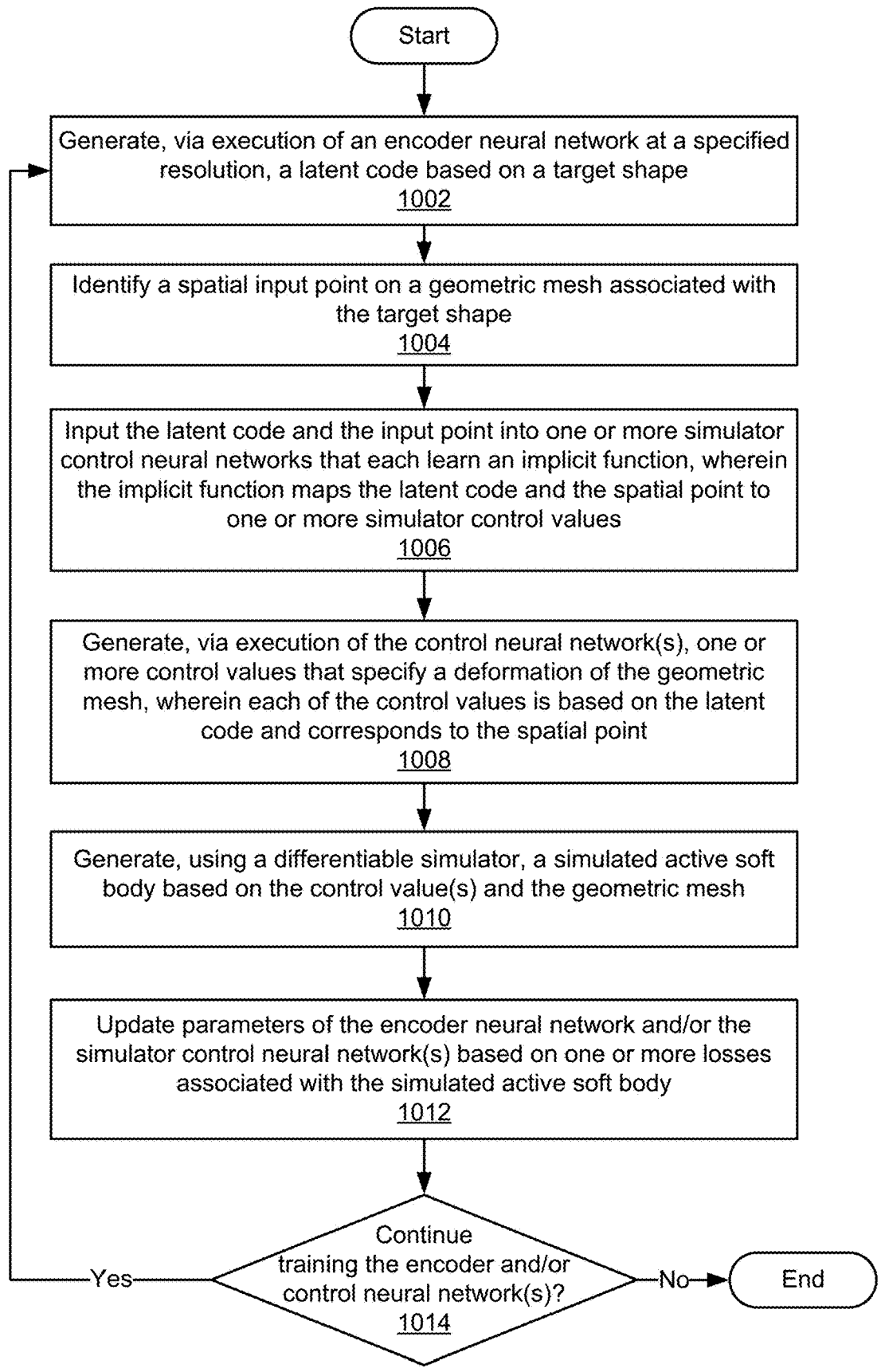
FIG. 10 is a flow diagram of method steps for training one or more machine learning models to generate simulated soft body objects, according to various embodiments.

FIG. 10 is a flow diagram of method steps for training one or more machine learning models 201, 202 to generate simulated soft body objects 230, according to various embodiments. Although the method steps are described in conjunction with the systems of FIGS. 1-2B, persons skilled in the art will understand that any system configured to perform the method steps in any order falls within the scope of the present disclosure.

As shown, in step 1002, training engine 122 generates, via execution of an encoder neural network at a specified resolution 204, a latent code 210 based on a target shape 208. The training engine 122 can input the target shape and the specified resolution into an encoder neural network, and the encoder neural network can generate the latent code 210 that represents the target shape 208. The resolution 204 can include a particular input resolution and/or a particular output resolution, in which case the encoder neural network uses the specified input resolution to read the target shape, and/or encodes the target shape into the latent code using the specified output resolution.

In step 1004, training engine 122 identifies a spatial input point 214 on a geometric mesh 226 or 228 associated with the target shape 208. The training engine 122 can identify one of the input points 214 on the geometric mesh at the resolution 204. The encoder neural network can be trained for particular points 214 at a resolution 204, but because the encoder neural network learns a continuous function, the encoder neural network can be used for any point on a mesh in any specified resolution subsequent to training. Steps 1004, 1006, and 1008 can be repeated for each point on the geometric mesh at the particular resolution.

In step 1006, training engine 122 inputs the latent code 210 and the input point 214 into one or more simulator control neural networks 250 that each learn an implicit function. The simulator control neural networks 250 can include an actuation network 212 and/or a bone position network 218. For example, the actuation network 212 and the bone position network 218 can learn different implicit functions. Each implicit function maps the latent code 210 and the spatial point 214 to one or more simulator control values 252. The simulator control values can include an actuation matrix for each of the of points 214.

In step 1008, training engine 122 generates, via execution of the simulator control neural network(s) 250, one or more control values 252 that specify a deformation of the geometric mesh 225, where each of the control values 252 is based on the latent code 210 and corresponds to the spatial input point 214.

To generate the simulated soft body 230, the training engine 122 generates, via execution of the differentiable simulator 224, an actuated geometric mesh 228 by deforming the initial geometric mesh 226 based on the simulator control values 252. In step 1010, training engine 122 generates, using the differentiable simulator 224, a simulated active soft body 230 based on the control value(s) 252 and the initial geometric mesh 226 and/or the actuated geometric mesh 228. To generate the simulated active soft body 230, the training engine 122 generates or updates, via execution of the differentiable simulator 224, the actuated geometric mesh 228 by deforming the initial geometric mesh 226 and/or the actuated geometric mesh 228 based on the simulator control values 252. The training engine 122 generates the simulated soft body 230 based on the actuated geometric mesh 228, e.g., by mapping the actuated geometric mesh 228 from a simulation space to an observation space.

In step 1012, training engine 122 updates parameters of the encoder neural network and/or the simulator control neural network(s) based on one or more losses associated with the simulated active soft body 230. Training engine 122 can train the encoder neural network by computing the simulation loss 232 between the target shape 208 and the soft body 230. The simulation loss 232 can include (but is not limited to) a loss between the vertices 228 of soft body 230 and the vertices of the ground truth target shape 208 and/or a loss between normals of the vertices of soft body 230 and normals of the vertices 228 of target shape 208, or another measure of error between the ground truth target shape 208 and the soft body 230. Training engine 122 can then use gradient descent and backpropagation to update neural network weights or other parameters of the encoder neural network in a way that reduces the measure of error. For example, training engine 122 can calculate the gradient accumulated on the vertices of the soft body 230 and back propagate the gradient to the encoder neural network. The back propagation to the encoder neural network updates parameters of the encoder neural network.

Training engine 122 trains the actuation network 212 and/or the bone position network 218 based on the simulation loss 232 as described above with respect to FIG. 2A by propagating the gradient accumulated on the vertices 228 of the actuated geometric mesh 228 to the simulator control values 252. The gradient accumulated on the vertices 228 can be propagated to the actuation values 216 by multiplying the gradient accumulated on the vertices by the sensitivity matrix as described above. Training engine 122 can then use gradient descent based on the gradient accumulated on the actuation values 216 and backpropagation to update neural network weights in the actuation network 212 in a way that reduces the measure of error.

In step 1012, training engine 122 can train the actuation network 212 and/or the bone position network 218 by determining a first gradient accumulated on one or more geometric vertices 228 of the simulated soft body 230, determining, based on the first gradient, a second gradient accumulated on the one or more simulator control values 252; and updating one or more weights of the actuation network 212 or bone network 218 based on the second gradient. Training engine 122 can calculate the second gradient by multiplying the first gradient by a sensitivity matrix calculated for the network being trained based on the loss. The sensitivity matrix based on a closed-form Hessian of an energy density function. More specifically, the sensitivity matrix can be based on a product of a Hessian associated with the first gradient and a Hessian associated with the second gradient.

In step 1012, training engine 122 can train the bone position network 218 by inputting the latent code 210 and the point 214 on the geometric mesh 226 into the bone position network 218, where the point 214 on the initial geometric mesh 226 corresponds to a bone region of the target shape 208. The training engine can then generate, via execution of the bone network 218, a transformed bone region position to which the point 214 on the initial geometric mesh 226 is to be moved, such that simulator control values 252 include the transformed bone region position.

In step 1014, training engine 122 determines whether or not training of the encoder neural network and/or the simulator control neural network(s) 250 is to continue. For example, training engine 122 can determine that the encoder neural network and the simulator control networks 250 should continue to be trained using a simulation loss until one or more conditions are met. These condition(s) include (but are not limited to) convergence in the parameters of the encoder neural network and/or simulator control networks 250, lowering of the simulation loss to below a threshold, and/or a certain number of training steps, iterations, batches, and/or epochs. While training of the first set of neural networks continues, training engine 122 repeats steps 1002 through 1012. Training engine 122 then ends the process of training the encoder neural network and/or the control network(s) 250 once the condition(s) are met.

Training engine 122 could also, or instead, perform one or more rounds of end-to-end training of the encoder neural network, the actuation network 212, and the bone position network 218 to optimize the operation of all networks to the task of training one or more machine learning models 201, 202 to generate simulator control values 252 that cause a differentiable simulator 224 to produce active soft body objects 230 that resemble specified target shapes 208.

Figure 11:
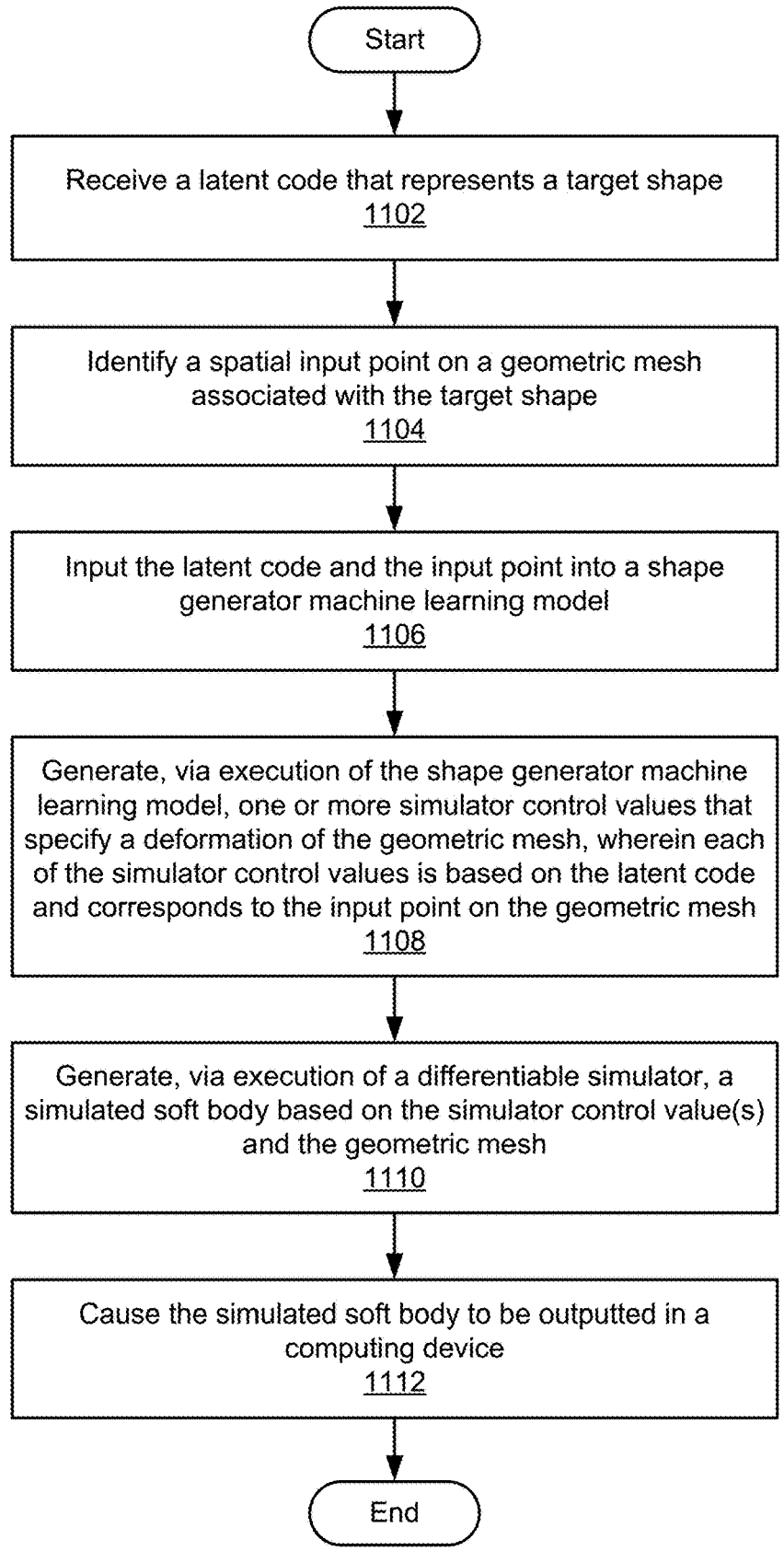
FIG. 11 is a flow diagram of method steps for generating a simulated soft body object, according to various embodiments.

FIG. 11 is a flow diagram of method steps for generating a simulated soft body object 230, according to various embodiments. Although the method steps are described in conjunction with the systems of FIGS. 1-2B, persons skilled in the art will understand that any system configured to perform the method steps in any order falls within the scope of the present disclosure.

As shown, in step 1102, execution engine 124 receives a latent code 210 that represents a new target shape 262. The new target shape 262 can be different from the target shape(s) 208 on which the shape generator ML model 201 (including the actuation network 212 and the bone position network 218) was trained. Execution engine 124 can also receive a resolution 204.

In step 1104, execution engine 124 identifies a spatial input point 214 on a geometric mesh 226 associated with the new target shape 262. The points 214 can be identified based on the resolution 204. In step 1106, execution engine 124 inputs the latent code 210 and the input point 214 into a shape generator ML model 201. The shape generator ML model 201 can include an actuation network 212 and/or a bone position network 218.

In step 1108, execution engine 124 generates, via execution of the shape generator ML model 201, one or more simulator control values 252 that specify a deformation of the initial geometric mesh 225, where each of the simulator control values is based on the latent code 210 and corresponds to the input point 214 on the geometric mesh. The control values 252 can include actuation values 216 and/or bone position values 222.

In step 1110, execution engine 124 generates, via execution of a differentiable simulator 224, a simulated soft body 230 based on the simulator control value(s) 252 and the initial geometric mesh 226. In step 1112, execution engine 124 causes the simulated soft body 230 to be outputted to a computing device 100, where the simulated soft body 230 is used to perform one or more simulation operations. The soft body 230 can deform realistically in response to user instructions provided to the differentiable simulator 224.

In sum, the disclosed techniques generate actuation values based on a target shape, such that the actuation values cause a simulator to output a simulated soft body that matches the target shape. Each actuation value can specify an amount by which a corresponding element of a geometric mesh is to stretch or contract. The simulated soft body output by the simulator is a geometric mesh deformed in accordance with the actuation values and additional constraints, if any. The additional constraints can be provided to the simulator to produce animation effects such as distortion of facial skin to model expressions or contact with other objects.

In operation, an actuation neural network is trained, using a set of target shapes, to produce the actuation values that cause the simulator to output a simulated soft body that resembles the target shapes. The actuation neural network uses an implicit representation in which a learned implicit function maps any coordinate position on a geometric mesh to a corresponding actuation value for the coordinate position. Evaluating the implicit function at points distributed across the mesh produces actuation values distributed across the mesh. The actuation values can then be provided to the simulator as input to cause the simulator to output a simulated soft body. The actuation neural network uses the learned implicit function to map different coordinate positions on the geometric mesh than those used in the training process, so the actuation neural network is resolution independent. Further, the actuation neural network can use the learned implicit function to map different input shapes or input shape representation formats than those used in the training process, so the actuation neural network is independent of a particular input shape representation.

The simulator is differentiable, so a loss function can be defined to calculate an amount of loss that quantifies a difference between the target shapes and the simulated soft body. The actuation neural network can be trained by back-propagating the amount of loss through the simulator. The back propagation optimizes the actuation neural network by computing a gradient for the actuation parameters produced by the model and using the gradient to update the model until the amount of loss is minimized. The gradient is computed using an efficient closed-form solution derived for the implicit representation.

A bone position neural network can be trained, using a set of target shapes, to output actuation signals for a simulator. The actuation signals cause the simulator to output simulated jaw bone movements that resemble jaw bone movements depicted in the target shapes. The bone position network can use an implicit representation in which a learned implicit function maps any coordinate position on a geometric mesh to a corresponding actuation value for the coordinate position. The bone position neural network receives a position of a sampled point on a bone region of a face as input and outputs a transformed position to which the point on the bone region is to be moved. The same transformation is shared across all the sampled points on the bone region, so the bone region moves as a rigid shape. The bone position neural network can be trained by back propagating loss computed by a loss function via the simulator. The gradient of the loss function for bone modeling is different from the gradient for soft body modeling (described above), but the computation of the jaw gradient is based on the same closed-form solution described above. The first and actuation neural network and the bone position neural network can be trained together using the same loss function. In such a case, the bone position neural network can output the position of the jaw and the actuation neural network can output actuation signals specifying how a soft body representation of a face is to actuate in order to produce facial deformations that occur when the jaw moves.

One technical advantage of the disclosed techniques relative to the prior art is that the implicit function technique enables the neural network to be substantially smaller in size relative to neural networks used in existing techniques, while reliably reproducing fine details such as wrinkles. Another technical advantage of the disclosed techniques is that the actuation neural network can be used for any input resolution, including resolutions that are higher or lower than the resolution for which the network was trained. Still another technical advantage of the disclosed techniques is that the gradient is computed using an efficient closed-form solution that does not involve the iterative approximation used by other gradient calculation techniques. Thus, the gradient can be computed more accurately and efficiently relative to other approaches to soft body modeling. These technical advantages provide one or more technological improvements over prior art approaches.

1. In some embodiments, a computer-implemented method comprises receiving a latent code that represents a target shape; inputting the latent code and an input point on a geometric mesh associated with the target shape into a first machine learning model; generating, via execution of the first machine learning model, one or more simulator control values that specify a deformation of the geometric mesh, wherein each of the simulator control values is based on the latent code and corresponds to the input point on the geometric mesh; generating, via execution of a differentiable simulator, a simulated soft body based on the one or more simulator control values and the geometric mesh; and causing the simulated soft body to be outputted to a computing device, wherein the simulated soft body is used to perform one or more simulation operations.

2. The computer-implemented method of clause 1, wherein generating, via execution of the differentiable simulator, the simulated soft body comprises generating, via execution of the differentiable simulator, an actuated geometric mesh by deforming the geometric mesh based on the one or more simulator control values; wherein the simulated soft body is generated based on the actuated geometric mesh.

3. The computer-implemented method of clause 1, further comprising inputting the target shape and a specified resolution into an encoder machine learning model; and generating, via execution of the encoder machine learning model for the specified resolution, the latent code that represents the target shape.

4. The computer-implemented method of clause 3, wherein the first machine learning model identifies the input point on the geometric mesh based on the specified resolution.

5. The computer-implemented method of clause 4, wherein the first machine learning model is configured to map any point in any particular resolution to a corresponding actuation value.

6. The computer-implemented method of clause 4, wherein the first machine learning model is resolution-independent.

7. The computer-implemented method of clause 1, further comprising training the first machine learning model based on one or more losses associated with the simulated soft body.

8. The computer-implemented method of clause 7, wherein the one or more losses comprise a similarity loss that is computed based on the target shape and the simulated soft body.

9. The computer-implemented method of clause 7, wherein training the first machine learning model causes the first machine learning model to learn an implicit function that maps the latent code and the input point on the geometric mesh to one of the simulator control values that specifies the deformation of the geometric mesh at the input point.

10. The computer-implemented method of clause 7, wherein training the first machine learning model comprises determining a first gradient accumulated on one or more geometric vertices of the simulated soft body; determining, based on the first gradient, a second gradient accumulated on the one or more simulator control values; and updating one or more weights of the first machine learning model based on the second gradient.

11. The computer-implemented method of clause 10, wherein determining, based on the first gradient, the second gradient accumulated on the one or more simulator control values comprises multiplying the first gradient by a sensitivity matrix.

12. The computer-implemented method of clause 11, wherein the sensitivity matrix based on a closed-form Hessian of an energy density function.

13. The computer-implemented method of clause 11, wherein the input point is one of a plurality of input points, and the generating, generating, via execution of the first machine learning model, one or more simulator control values is repeated for each of the plurality of input points.

14. The computer-implemented method of clause 13, wherein the first machine learning model comprises an actuation neural network, and the one or more simulator control values comprise an actuation matrix for each of the plurality of input points.

15. The computer-implemented method of clause 1, wherein the first machine learning model comprises a bone position neural network, and the method further comprises inputting the latent code and the input point on the geometric mesh into the bone position neural network, wherein the input point on the geometric mesh corresponds to a bone region of the target shape; and generating, via execution of the bone position neural network, a transformed bone region position to which the input point on the geometric mesh is to be moved, wherein the one or more simulator control values comprise the transformed bone region position.

16. The computer-implemented method of clause 1, wherein the latent code is a value in a latent control space of the differentiable simulator.

17. In some embodiments, one or more non-transitory computer-readable media store instructions that, when executed by one or more processors, cause the one or more processors to perform the steps of receiving a latent code that represents a target shape; inputting the latent code and an input point on a geometric mesh associated with the target shape into a first machine learning model; generating, via execution of the first machine learning model, one or more simulator control values that specify a deformation of the geometric mesh, wherein each of the simulator control values is based on the latent code and corresponds to the input point on the geometric mesh; generating, via execution of a differentiable simulator, a simulated soft body based on the one or more simulator control values and the geometric mesh; and causing the simulated soft body to be outputted to a computing device, wherein the simulated soft body is used to perform one or more simulation operations.

18. The one or more non-transitory computer-readable media of clause 17, wherein generating, via execution of the differentiable simulator, the simulated soft body comprises generating, via execution of the differentiable simulator, an actuated geometric mesh by deforming the geometric mesh based on the one or more simulator control values; wherein the simulated soft body is generated based on the actuated geometric mesh.

19. The one or more non-transitory computer-readable media of clause 17, further comprising inputting the target shape and a specified resolution into an encoder machine learning model; and generating, via execution of the encoder machine learning model for the specified resolution, the latent code that represents the target shape.

20. In some embodiments, a system comprises one or more memories that store instructions, and one or more processors that are coupled to the one or more memories and, when executing the instructions, are configured to perform the steps of receiving a latent code that represents a target shape; inputting the latent code and an input point on a geometric mesh associated with the target shape into a first machine learning model; generating, via execution of the first machine learning model, one or more simulator control values that specify a deformation of the geometric mesh, wherein each of the simulator control values is based on the latent code and corresponds to the input point on the geometric mesh; generating, via execution of a differentiable simulator, a simulated soft body based on the one or more simulator control values and the geometric mesh; and causing the simulated soft body to be outputted to a computing device, wherein the simulated soft body is used to perform one or more simulation operations.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
receiving a latent code that represents a target shape;
inputting the latent code and an input point on a geometric mesh associated with the target shape into a first machine learning model;
generating, via execution of the first machine learning model, one or more simulator control values that specify a deformation of the geometric mesh, wherein each of the simulator control values is based on the latent code and corresponds to the input point on the geometric mesh;
generating, via execution of a differentiable simulator, a simulated soft body based on the one or more simulator control values and the geometric mesh; and
causing the simulated soft body to be outputted to a computing device, wherein the simulated soft body is used to perform one or more simulation operations.

2. The computer-implemented method of claim 1, wherein generating, via execution of the differentiable simulator, the simulated soft body comprises:
generating, via execution of the differentiable simulator, an actuated geometric mesh by deforming the geometric mesh based on the one or more simulator control values;
wherein the simulated soft body is generated based on the actuated geometric mesh.

3. The computer-implemented method of claim 1, further comprising:
inputting the target shape and a specified resolution into an encoder machine learning model; and
generating, via execution of the encoder machine learning model for the specified resolution, the latent code that represents the target shape.

4. The computer-implemented method of claim 3, wherein the first machine learning model identifies the input point on the geometric mesh based on the specified resolution.

5. The computer-implemented method of claim 4, wherein the first machine learning model is configured to map any point in any particular resolution to a corresponding actuation value.

6. The computer-implemented method of claim 4, wherein the first machine learning model is resolution-independent.

7. The computer-implemented method of claim 1, further comprising training the first machine learning model based on one or more losses associated with the simulated soft body.

8. The computer-implemented method of claim 7, wherein the one or more losses comprise a similarity loss that is computed based on the target shape and the simulated soft body.

9. The computer-implemented method of claim 7, wherein training the first machine learning model causes the first machine learning model to learn an implicit function that maps the latent code and the input point on the geometric mesh to one of the simulator control values that specifies the deformation of the geometric mesh at the input point.

10. The computer-implemented method of claim 7, wherein training the first machine learning model comprises:
determining a first gradient accumulated on one or more geometric vertices of the simulated soft body;
determining, based on the first gradient, a second gradient accumulated on the one or more simulator control values; and updating one or more weights of the first machine learning model based on the second gradient.

11. The computer-implemented method of claim 10, wherein determining, based on the first gradient, the second gradient accumulated on the one or more simulator control values comprises multiplying the first gradient by a sensitivity matrix.

12. The computer-implemented method of claim 11, wherein the sensitivity matrix based on a closed-form Hessian of an energy density function.

13. The computer-implemented method of claim 11, wherein the input point is one of a plurality of input points, and the generating, generating, via execution of the first machine learning model, one or more simulator control values is repeated for each of the plurality of input points.

14. The computer-implemented method of claim 13, wherein the first machine learning model comprises an actuation neural network, and the one or more simulator control values comprise an actuation matrix for each of the plurality of input points.

15. The computer-implemented method of claim 1, wherein the first machine learning model comprises a bone position neural network, and the method further comprises:
inputting the latent code and the input point on the geometric mesh into the bone position neural network, wherein the input point on the geometric mesh corresponds to a bone region of the target shape; and
generating, via execution of the bone position neural network, a transformed bone region position to which the input point on the geometric mesh is to be moved, wherein the one or more simulator control values comprise the transformed bone region position.

16. The computer-implemented method of claim 1, wherein the latent code is a value in a latent control space of the differentiable simulator.

17. One or more non-transitory computer-readable media storing instructions that, when executed by one or more processors, cause the one or more processors to perform the steps of:
receiving a latent code that represents a target shape;
inputting the latent code and an input point on a geometric mesh associated with the target shape into a first machine learning model;
generating, via execution of the first machine learning model, one or more simulator control values that specify a deformation of the geometric mesh, wherein each of the simulator control values is based on the latent code and corresponds to the input point on the geometric mesh;
generating, via execution of a differentiable simulator, a simulated soft body based on the one or more simulator control values and the geometric mesh; and
causing the simulated soft body to be outputted to a computing device, wherein the simulated soft body is used to perform one or more simulation operations.

18. The one or more non-transitory computer-readable media of claim 17, wherein generating, via execution of the differentiable simulator, the simulated soft body comprises:
generating, via execution of the differentiable simulator, an actuated geometric mesh by deforming the geometric mesh based on the one or more simulator control values;
wherein the simulated soft body is generated based on the actuated geometric mesh.

19. The one or more non-transitory computer-readable media of claim 17, further comprising:
inputting the target shape and a specified resolution into an encoder machine learning model; and
generating, via execution of the encoder machine learning model for the specified resolution, the latent code that represents the target shape.

20. A system, comprising:
one or more memories that store instructions, and
one or more processors that are coupled to the one or more memories and, when executing the instructions, are configured to perform the steps of:
receiving a latent code that represents a target shape;
inputting the latent code and an input point on a geometric mesh associated with the target shape into a first machine learning model;
generating, via execution of the first machine learning model, one or more simulator control values that specify a deformation of the geometric mesh, wherein each of the simulator control values is based on the latent code and corresponds to the input point on the geometric mesh;
generating, via execution of a differentiable simulator, a simulated soft body based on the one or more simulator control values and the geometric mesh; and
causing the simulated soft body to be outputted to a computing device, wherein the simulated soft body is used to perform one or more simulation operations.

* * * * *

UNITED STATES PATENT AND TRADEMARK OFFICE
CERTIFICATE OF CORRECTION

| | | |
|---|---|---|
| PATENT NO. | : 12,223,577 B2 | Page 1 of 1 |
| APPLICATION NO. | : 18/159651 | |
| DATED | : February 11, 2025 | |
| INVENTOR(S) | : Gaspard Zoss et al. | |

It is certified that error appears in the above-identified patent and that said Letters Patent is hereby corrected as shown below:

In the Specification

In Column 11, Line 55, delete "$\nabla_u E(u^*, \Omega)=0.$" and insert -- $\nabla_u E(u^*, \Omega)=0.$ --.

In Column 12, Lines 59-61, delete "$\tilde{E} = \int_{\mathcal{D}^0} \frac{1}{2} \|\tilde{f}(x) - \hat{A}(x)\tilde{r}^*(x)\|_2^2 dV,$" and insert -- $\tilde{E} = \int_{\mathcal{D}^0} \frac{1}{2} \|\check{f}(x) - \hat{A}(x)\check{r}^*(x)\|_2^2 dV,$ --.

In Column 13, Lines 33-35, delete "$G^\top G - G^\top \hat{A} \frac{\partial \check{r}}{\partial \hat{A}f} \hat{A} G$" and insert -- $= G^\top G - G^\top \hat{A} \frac{\partial \check{r}}{\partial \hat{A}f} \hat{A} G$ --.

In Column 13, Line 36, delete "$G^\top G - G^\top \hat{A} H_R \hat{A} G.$" and insert -- $= G^\top G - G^\top \hat{A} H_R \hat{A} G.$ --.

In Column 14, Line 8, delete "$W_{i,j} = \alpha_i \cdot \hat{W}_{i,j}.$" and insert -- $W_{i,j} = a_i \cdot \hat{W}_{i,j}.$ --.

In Column 15, Line 15, delete "$\nabla_{u_c} E([u^*_c, u_d], \mathcal{A}) = 0,$" and insert -- $\nabla_{u_c} E([u^*_c, u_d], \mathcal{A}) = 0.$ --.

Signed and Sealed this
Second Day of September, 2025

Coke Morgan Stewart
*Acting Director of the United States Patent and Trademark Office*